(12) United States Patent
Yamazaki et al.

(10) Patent No.: US 8,654,407 B2
(45) Date of Patent: Feb. 18, 2014

(54) MULTIFUNCTION APPARATUS

(75) Inventors: Masato Yamazaki, Tokyo (JP); Hidenori Ueda, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 13/545,056

(22) Filed: Jul. 10, 2012

(65) Prior Publication Data
US 2012/0281247 A1    Nov. 8, 2012

Related U.S. Application Data

(62) Division of application No. 11/677,297, filed on Feb. 21, 2007, now Pat. No. 8,237,995.

(30) Foreign Application Priority Data

Feb. 22, 2006    (JP) .................................. 2006-045542
Dec. 18, 2006    (JP) .................................. 2006-340335

(51) Int. Cl.
*H04N 1/21*    (2006.01)
*H04N 1/23*    (2006.01)

(52) U.S. Cl.
USPC .............. 358/401; 358/296; 358/474; 16/327

(58) Field of Classification Search
USPC ........................................................ 358/296
See application file for complete search history.

(56) References Cited

U.S. PATENT DOCUMENTS

| | | | |
|---|---|---|---|
| 5,162,846 A * | 11/1992 | Cahill | 399/125 |
| 6,163,927 A | 12/2000 | Leu | |
| 6,462,839 B1 | 10/2002 | Short | |
| 6,510,301 B2 * | 1/2003 | Tanaka | 399/125 |
| 6,556,314 B1 * | 4/2003 | Shiraishi et al. | 358/471 |
| 6,984,144 B1 | 1/2006 | Nelson et al. | |
| 7,299,525 B2 | 11/2007 | Chang | |
| 7,302,221 B2 * | 11/2007 | Shyu | 399/367 |

(Continued)

FOREIGN PATENT DOCUMENTS

| | | |
|---|---|---|
| JP | 63-231459 A | 9/1988 |
| JP | 04355746 A | 12/1992 |

(Continued)

OTHER PUBLICATIONS

JPO Machine translation of JP 2006042003 A.*

(Continued)

*Primary Examiner* — Richard Zhu
(74) *Attorney, Agent, or Firm* — Panitch Schwarze Belisario & Nadel LLP

(57) ABSTRACT

A scanner is mounted on a printer. A printer lid is pivotally mounted to the printer, and is moveable to open and close. A scanner lid is pivotally mounted to the scanner, and is moveable to open and close. A printer locking member and a scanner locking member are pivotally mounted to the scanner. Opening the scanner lid causes the printer locking member to pivot to lock the scanner to the printer. Opening the printer lid causes the scanner locking member to pivot to lock the scanner lid to the scanner. A scanner having a lid is pivotally mounted on a printer. When the lid is pivoted to open, a stopper may pivot together with the lid and abut the scanner, thereby stopping the lid. The stopper may pivot together with the lid and the scanner and abuts the printer, stopping the lid and the scanner.

8 Claims, 33 Drawing Sheets

(56) References Cited

U.S. PATENT DOCUMENTS

| | | |
|---|---|---|
| 7,418,766 B2 | 9/2008 | Nelson et al. |
| 7,561,825 B2 | 7/2009 | Hirose et al. |
| 2006/0222435 A1 * | 10/2006 | Ha et al. ................ 400/691 |

FOREIGN PATENT DOCUMENTS

| | | | |
|---|---|---|---|
| JP | 11084983 A * | 3/1999 | |
| JP | 2001175045 A | 6/2001 | |
| JP | 2005053648 A | 3/2005 | |
| JP | 2006042003 A * | 2/2006 | |

OTHER PUBLICATIONS

Machine translation of JP11-084983.*
Office Action dated Nov. 18, 2008 in counterpart Japanese Application No. 2006-340335.
Office Action dated Sep. 1, 2009 in counterpart Japanese Application No. 2006-340335.
Office Action dated Feb. 2, 2010 in counterpart Japanese Application No. 2009-248027.
Office Action issued Jun. 4, 2010 in U.S. Appl. No. 11/677,297.
Office Action issued Feb. 18, 2011 in U.S. Appl. No. 11/677,297.
Office Action issued Sep. 9, 2011 in U.S. Appl. No. 11/677,297.

* cited by examiner

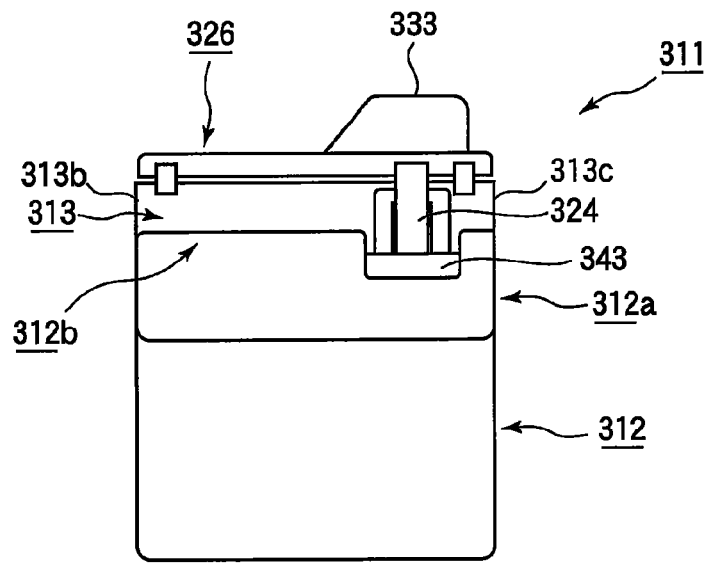
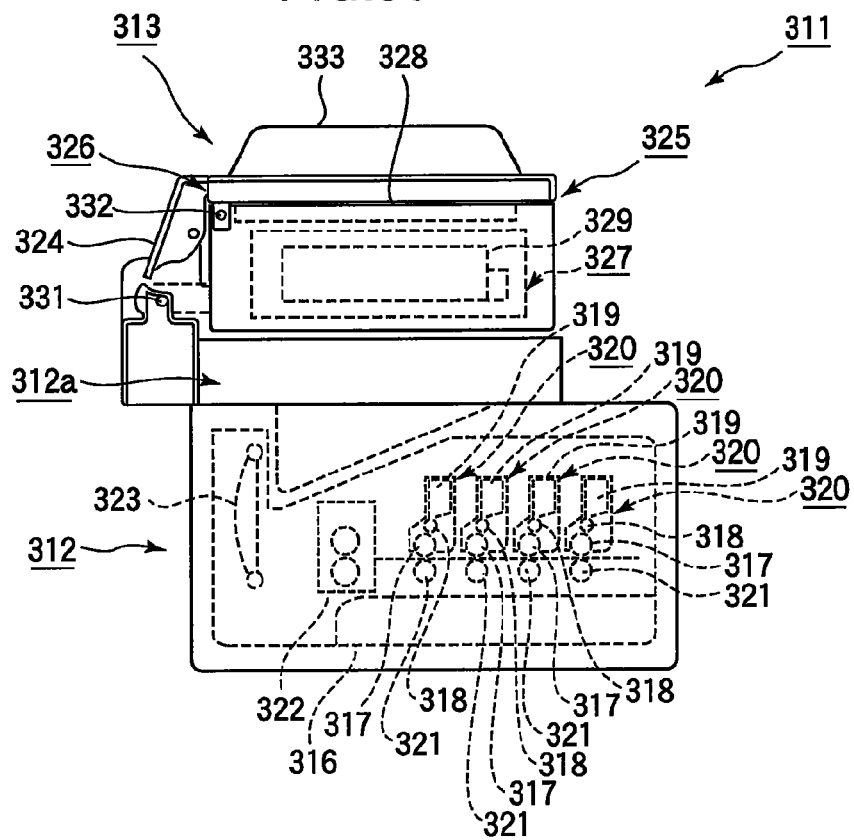

MULTIFUNCTION APPARATUS

CROSS-REFERENCE TO RELATED APPLICATIONS

This application is a divisional of copending U.S. application Ser. No. 11/677,297 filed Feb. 21, 2007, the disclosure of which is incorporated herein by reference.

BACKGROUND OF THE INVENTION

The present invention relates to a multifunction apparatus.

A conventional multifunction image processing apparatus includes a printer and a scanner mounted on the printer. The printer performs image formation by electrophotography. The scanner reads an image of an original. The cover of the scanner is opened through an angle for replacement of an original or maintenance of the scanner. The printer cover is opened together with the scanner for maintenance of the printer.

A conventional multifunction image processing apparatus suffers from a problem in that when the printer cover is opened with the cover of the scanner opened, the scanner will become unstable preventing efficient maintenance of the printer.

BRIEF SUMMARY OF THE INVENTION

An object of the invention is to solve the problem of conventional multifunction apparatuses.

Another object of the invention is to provide an image processing apparatus and a multifunction apparatus in which maintenance of a lower apparatus of stacked two apparatuses can be performed smoothly and efficiently.

A multifunction apparatus includes two units. A first unit including a first lid is pivotally mounted to the first unit, the first lid being moveable either to a first opening position or to a first closing position. A second unit is mounted to the first lid and includes a second lid pivotally mounted to the second unit. The second lid is moveable either to a second opening position or to a second closing position. A first locking member is pivotally mounted to the second unit. A second locking member pivotally mounted to the second unit. When the second lid is pivoted from the second closing position to the second opening position, the second lid disengages from the first locking member allowing the first locking member to engage the first unit to lock the second unit to the first unit. When the first lid is pivoted from the first closing position to the first opening direction, the first lid allows the second locking member to disengage from the first unit such that the second locking member locks the second lid to the second unit.

The multifunction apparatus further includes a first urging member and a second urging member. The first urging member urges the first locking member in such a direction that the first locking member engages the first unit, locking the second unit to the first unit. The second urging member urges the second locking member in such a direction that the second locking member engages the second lid, locking the second lid to the second unit.

A multifunction apparatus includes two units. A first unit supports a second unit such that the second unit is pivotal with respect to the first unit. The second unit includes a lid pivotally mounted to the second unit. A stopper is pivotally mounted to the second unit. When the lid is pivoted in an opening direction causing the stopper to pivot to a first position where the stopper abuts the second unit and the lid, preventing the lid from further pivoting. When the second unit is pivoted in an opening direction, the stopper pivots together with the second unit to a second position where the stopper prevents the second unit from further pivoting.

The stopper includes a first engagement portion and a second engagement portion. When the stopper pivots to the first position, the first engagement portion abuts the second unit to prevent the lid from pivoting further. When the stopper pivots to the second position, the second engagement portion abuts the first unit to prevent the second unit from pivoting further.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

The present invention will become more fully understood from the detailed description given hereinbelow and the accompanying drawings which are given by way of illustration only, and thus are not limiting the present invention, and wherein in the drawings:

FIG. 34 is a rear view of the multifunction apparatus;

FIG. 36 is a cross sectional side view of the multifunction apparatus;

DETAILED DESCRIPTION OF THE INVENTION

The invention will be described in terms of an image processing apparatus with reference to the accompanying drawings.

First Embodiment

Figure 1:
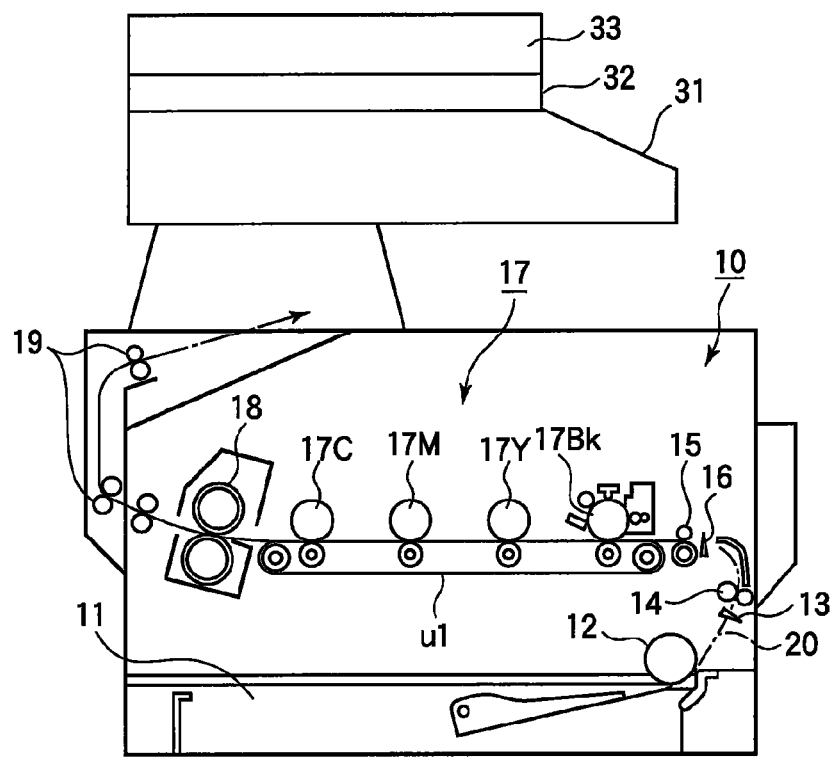
FIG. 1 illustrates a multifunction apparatus when a scanner cover and a printer cover are closed.

FIG. 1 illustrates an overall configuration of a multifunction apparatus.

Figure 2:
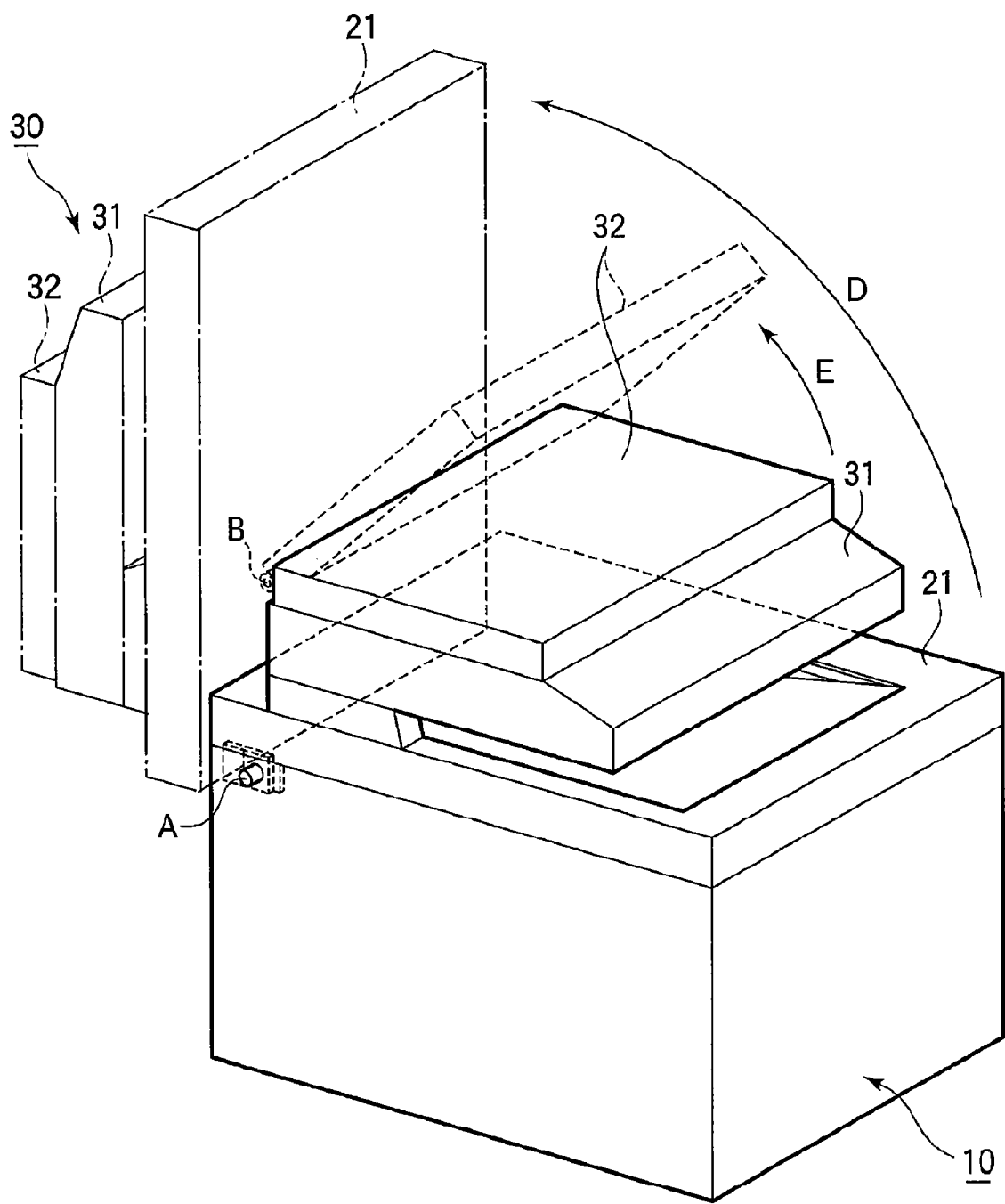
FIG. 2 illustrates an overall configuration of an image processing apparatus.

FIG. 2 is a perspective view illustrating a scanner 30.

Referring to FIGS. 1 and 2, the scanner 30 is mounted on a printer 10. The scanner 30 and printer 10 are electrically connected to each other, and form the multifunction apparatus as a whole.

The printer 10 includes a printer cover 21. The printer cover 21 is pivotal about pins A (only one of which is shown in FIG. 2) relative to a body of the printer body 10 in a direction shown by arrow D. The scanner 30 is mounted on the printer cover 21. An operator opens and closes the printer cover 21 for maintenance operations including removal of jammed paper and replacement of a toner cartridge and an image unit.

Referring to FIG. 1, the printer 10 includes a paper cassette 11 that holds a stack of sheets of paper therein. A feed roller 12 feeds paper on a sheet-by-sheet basis from the paper cassette 11 to a transport path 20. Sensors 13 and 16 detect the paper when the paper passes the sensors 13 and 16. A transport roller 14 corrects the skew of the paper. A transport roller 15 feeds the paper to image forming units 17 BK, 17Y, 17M, and 17C. The paper is transported along the transport path 20 through the image forming units 17 BK, 17Y, 17M, and 17C. A fixing unit 18 fixes images formed in the image forming units 17 BK, 17Y, 17M, and 17C into a permanent full color image. Discharge rollers 19 discharge the paper having a fixed full color image thereon onto a stacker 9 formed on the outer surface of the printer 10.

The image forming units BK, 17Y, 17M, and 17C form black, yellow, magenta, and cyan images, respectively. The image forming units BK, 17Y, 17M, and 17C are substantially identical, and differ in color only. For simplicity, only the image forming unit BK will be described, it being understood that the others may work in a similar fashion. The image forming unit BK includes a charging roller, a photoconductive drum 17BK, a developing roller, a toner supplying roller, a developing blade, and a cleaning blade.

An exposing unit is disposed over the photoconductive drum 17BK, and illuminates the charged surface of the photoconductive drum 17BK to form an electrostatic latent image on the photoconductive drum 17BK. A transfer unit U1 is disposed under the image forming units BK, 17Y, 17M, and 17C. The transfer unit U1 includes transfer rollers and a transfer belt that is entrained about the transfer rollers and runs along the line of the transfer rollers.

The feed roller 12 incorporates a one-way clutch, which rotates in one direction to transmit a drive force and in the other direction not to transmit a drive force. The fixing unit 18 includes a heat roller and a pressure roller.

The scanner 30 includes a scanner body 31, a scanner cover 32, and an automatic document feeder (ADF) 33. The ADF 33 cooperates with the scanner cover 32 to automatically feed a plurality of originals into the scanner 30. When the operator opens the scanner cover 32 in an opening direction for replacing the original on a flat bed formed on top of the scanner body 31, the scanner cover 32 is pivoted about pins B (FIG. 2), only one of which being shown in FIG. 2, in a direction shown by arrow E. When the scanner cover 32 has been closed completely, the scanner cover 32 is over the flat bed.

Figure 3:
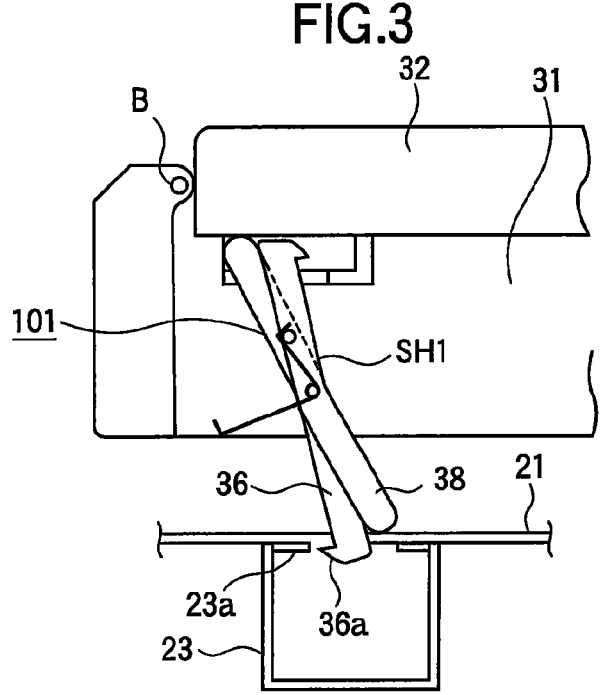
FIG. 3 is a perspective view illustrating the scanner.
Figure 4:
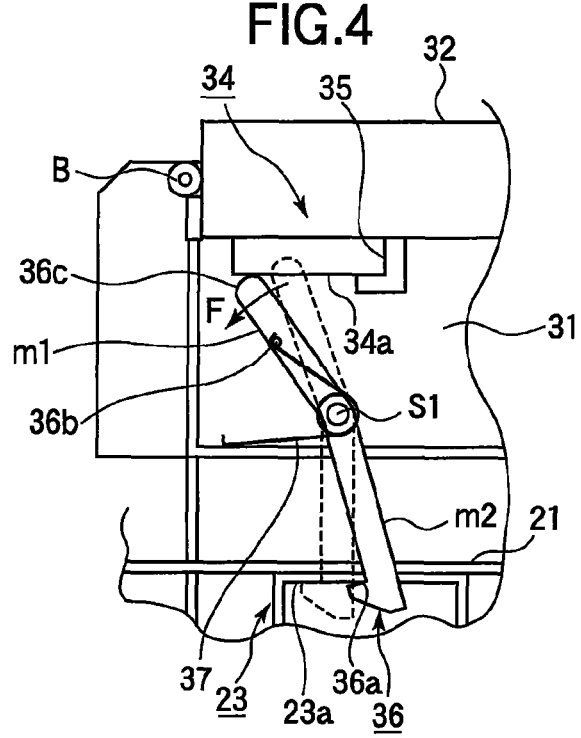
FIG. 4 illustrates a general configuration of a printer-locking lever.
Figure 5:
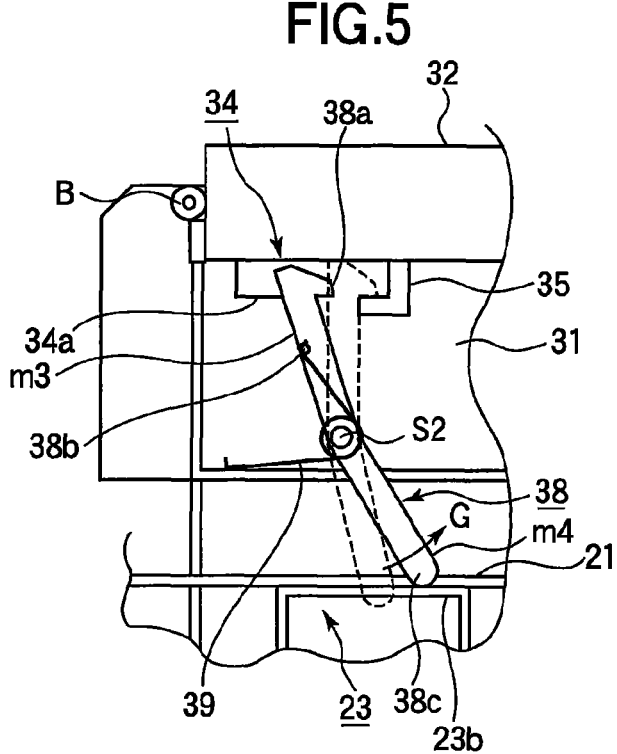
FIG. 5 illustrates a general configuration of a scanner-locking lever.
Figure 6:
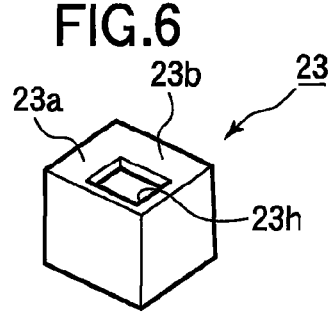
FIG. 6 is a perspective view of a first engagement member.
Figure 7:
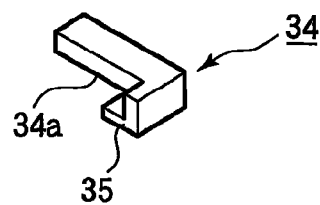
FIG. 7 is a perspective view of a second engagement member.

FIG. 3 illustrates the multifunction apparatus when the scanner cover 32 and the printer cover 21 are closed. FIG. 4 illustrates a general configuration of a printer-locking lever 36. FIG. 5 illustrates a general configuration of a scanner-locking lever 38. FIG. 6 is a perspective view of a first engagement member 23. FIG. 7 is a perspective view of a second engagement member 35.

Referring to FIG. 3, the scanner 30 is located on the printer 10. An opening/closing restricting mechanism 101 includes the printer-locking lever 36 and the scanner-locking lever 38. The opening/closing restricting mechanism 101 restricts opening and closing of the printer cover 21 and the scanner cover 32 as follows: When the scanner cover 32 is opened, the printer-locking lever 36 holds the printer cover 21 closed. When the printer cover 21 is opened, the scanner-locking lever 38 holds the scanner cover 32 closed.

Referring to FIG. 4, the printer-locking lever 36 is mounted at its middle portion to the scanner 31 such that the printer-locking lever 36 is pivotal about a shaft S1. The printer-locking lever 36 is generally in the shape of a boomerang, having a first bar m1 and a second bar m2 that form an obtuse angle with each other. The second bar m2 is formed with a hook 36a at its free end portion. A first engagement member 23 having an engagement piece 23a (FIG. 6) is attached to the scanner body 31. When the printer-locking lever 36 rotates about the shaft S1, the hook 36a engages the engagement piece 23a or disengages from the engagement piece 23a.

The first engagement member 23 may be separate from or in one piece with the printer cover 21. The first engagement member 23 projects outwardly from a side frame 22, and is formed with a hole 23h therein. Instead of using the engagement member 23, a groove or a hole may be formed in the printer cover 21 such that the hook 36a may enter the groove or the hole to achieve a hooking engagement with the printer cover 21.

A torsion spring 37 fits over the shaft S1, and has one end engaging a bottom of the scanner body 31 and another end engaging a projection 36b formed on the first bar m1 of the printer-locking lever 36. The spring 37 urges the printer-locking lever 36 in a direction opposite to a direction shown by arrow F, causing the hook 36a to engage the engagement piece 23a.

An engagement member 34 is formed on the scanner body 31. When the printer-locking lever 36 rotates about the shaft S1, the free end portion 36c of the first bar m1 engages the engaging member 34 or disengages from the engaging member 34.

When the scanner cover 32 is rotated in a closing direction, the engagement member 34 pushes the free end portion 36c of the first bar m1 such that the printer-locking lever 36 rotates in the direction shown by arrow F against the urging force of the spring 37, and therefore the hook 36a disengages from the engagement piece 23a.

Referring to FIG. 5, the scanner-locking lever 38 is mounted at its middle portion to the scanner 31 such that the scanner-locking lever 38 is pivotal about a shaft S2. The scanner-locking lever 38 is generally in the shape of a boomerang, having a first bar m3 and a second bar m4 that form an obtuse angle with each other. The first bar m3 is formed with a hook 38a at its free end portion. When the scanner-locking lever 38 rotates about the shaft S2, the hook 38a engages an engagement piece 35 or disengages from the engagement piece 35. The engagement piece 35 is adjacent to the abutment portion 34a of the engagement member 34 provided on the scanner body 31. The engagement member 34 may be separate from or in one piece with the scanner cover 32. While the engagement piece 35 is in the shape of a hook, the engagement piece 35 may be a groove or a hole.

A torsion spring 39 fits over the shaft S2, and has one end engaging the bottom of the scanner body 31 and another end engaging a projection 38b formed on the first bar m3 of the scanner-locking lever 38. The spring 39 urges the scanner-locking lever 38 in a direction opposite to a direction shown by arrow G so that the hook 38a engages an engagement piece 35.

The engagement member 23 includes an abutment portion 23b formed adjacent the engagement piece 23a. When the scanner-locking lever 38 rotates about the shaft S2, the free end portion of the second bar m4 engages the abutment portion 23b or disengages from the abutment portion 23b.

When the printer cover 21 is rotated in the closing direction, the engagement member 23 pushes the free end 38c of the scanner-locking lever 38, causing the scanner-locking lever 38 to rotate in the direction shown by arrow G against the urging force of the spring 39 so that the hook 38a disengages from the engagement piece 35.

FIG. 3 illustrates the multifunction apparatus when it is ready for normal use.

The printer-locking lever 36 is rotated in the C1 direction against the urging force of the spring 37 as shown in FIG. 4, so that the hook 36a disengages from the engagement piece 23a. The scanner-locking lever 38 is rotated in the C2 direction against the urging force of the spring 39, so that the hook 38a disengages from the engagement piece 35. As a result, both the scanner cover 32 and printer cover 21 are opened.

{Operation}

The operation of the opening/closing restricting mechanism 101 of the aforementioned configuration will be described in more detail.

Figure 8:
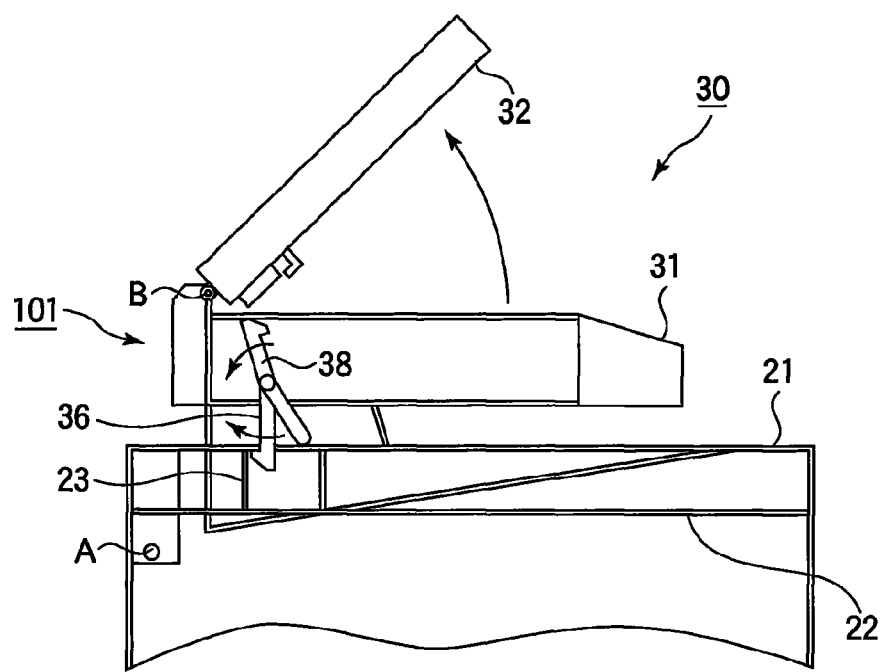
FIG. 8 illustrates the multifunction apparatus when the scanner cover is opened.

FIG. 8 illustrates the multifunction apparatus when the scanner cover is opened.

Figure 9:
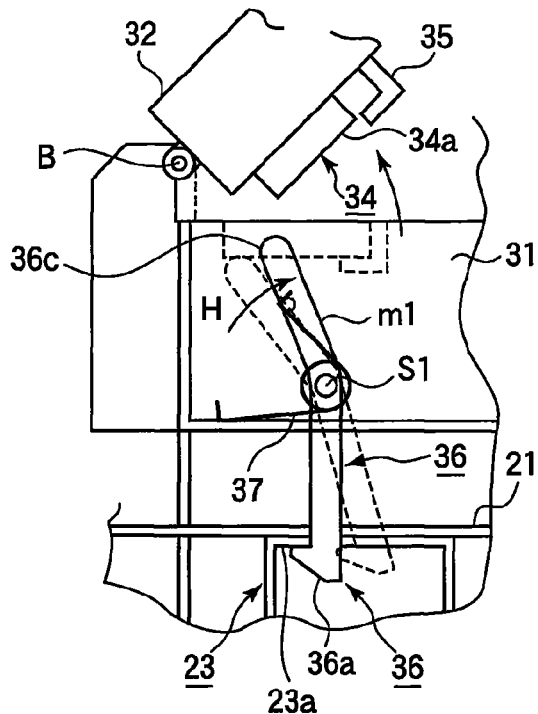
FIG. 9 is a front view illustrating the printer-locking lever when the scanner cover is opened.

FIG. 9 is a front view illustrating the printer-locking lever when the scanner cover is opened.

Figure 10:
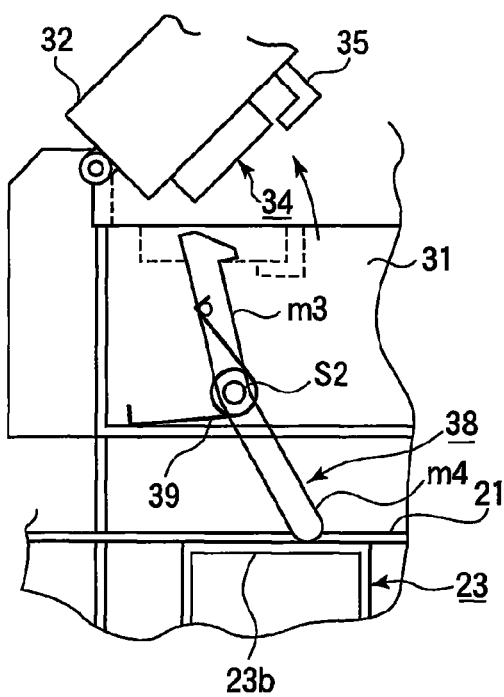
FIG. 10 is a front view illustrating the scanner-locking lever when the scanner cover is opened.

FIG. 10 is a front view illustrating the scanner-locking lever when the scanner cover is opened.

Figure 11:
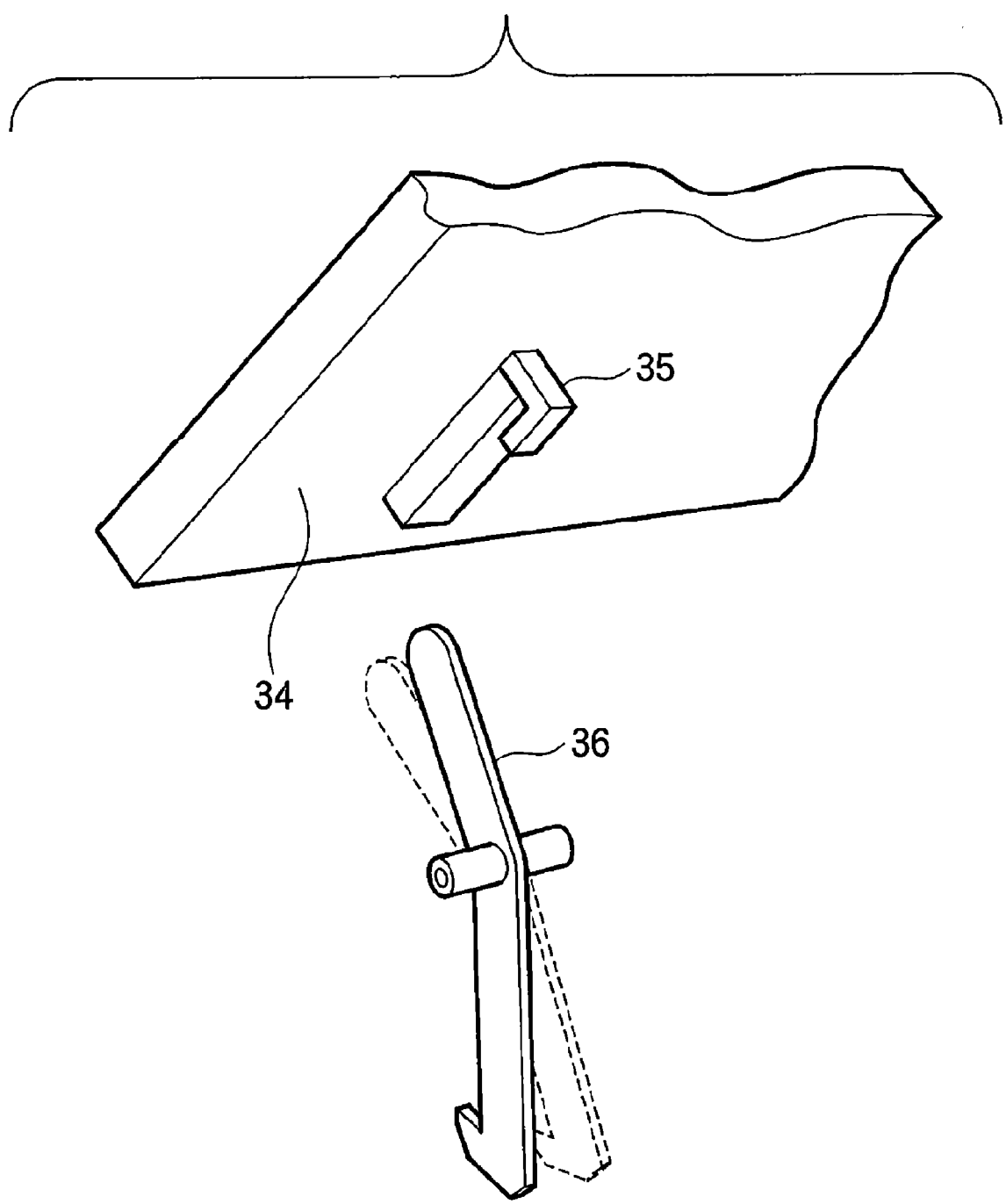
FIG. 11 is a perspective view illustrating the printer-locking lever when the scanner cover is opened.

FIG. 11 is a perspective view illustrating the printer-locking lever when the scanner cover is opened.

Figure 12:
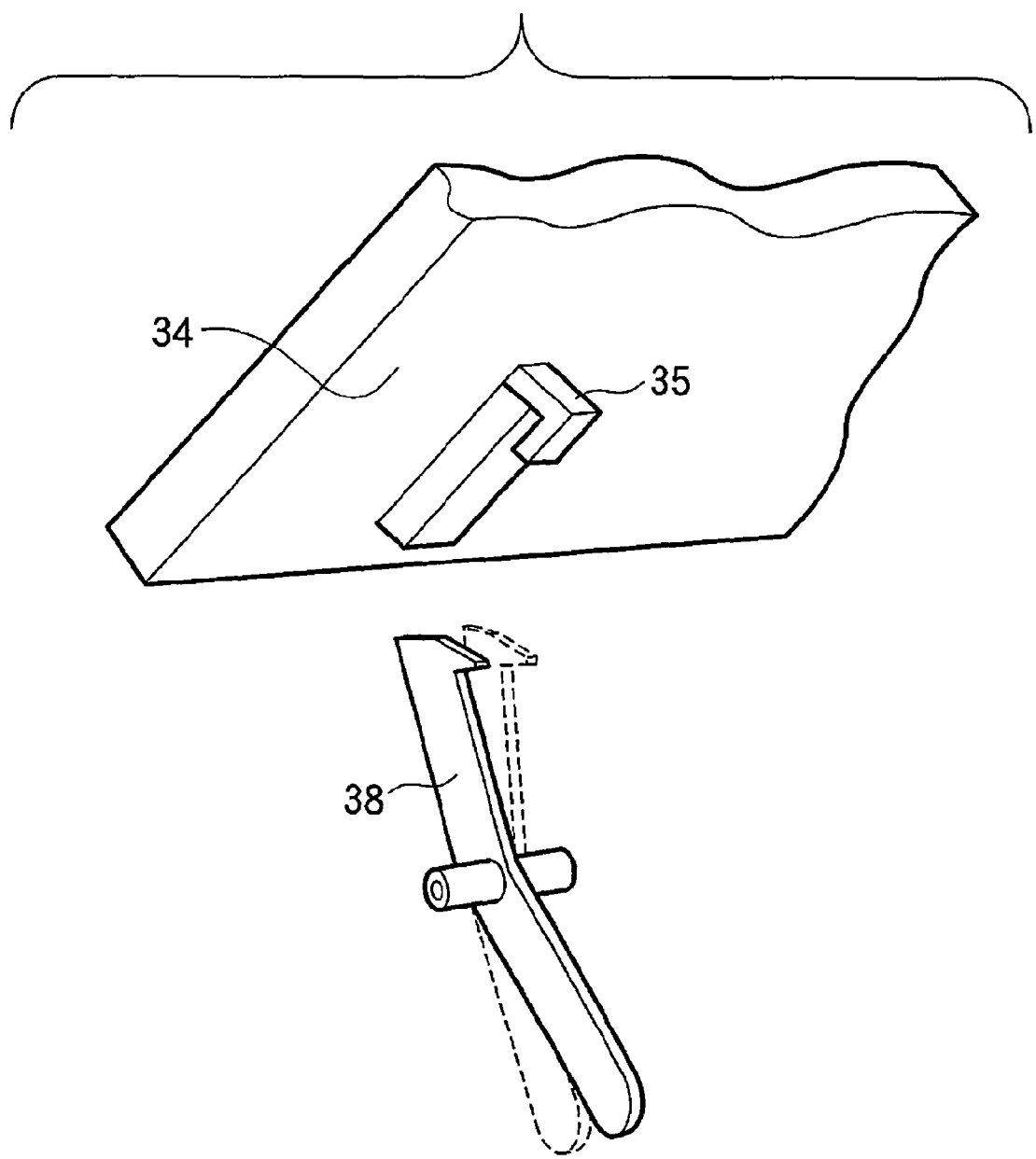
FIG. 12 is a perspective view illustrating the scanner-locking lever when the scanner cover is opened.

FIG. 12 is a perspective view illustrating the scanner-locking lever when the scanner cover is opened.

Referring to FIGS. 8 and 9, when the operator opens the scanner cover 32 for placing an original on the flat bed, the abutment portion 34a disengages from the first bar m1 of the printer-locking lever 36 so that the urging force of the spring 37 causes the printer-locking lever 36 to rotate about the shaft S1 in a direction shown by arrow H until the hook 36a engages the engagement piece 23a.

As a result, the printer cover 21 of the printer 10 is locked as shown in FIG. 9. At this moment, the free end of the fourth bar m4 remains in abutting engagement with the abutment portion 23b of the engagement member 23 as shown in FIG. 10.

When the operator rotates the scanner cover 32 in the closing direction after removing the original placed on the flat bed of the scanner body 31, the abutment portion 34a pushes down the free end 36c of the first bar m1, causing the printer-locking lever 36 to rotate in a direction opposite to the direction shown by arrow H, so that both the scanner cover 32 and the printer cover 21 are locked as shown in FIGS. 4 and 5.

Figure 13:
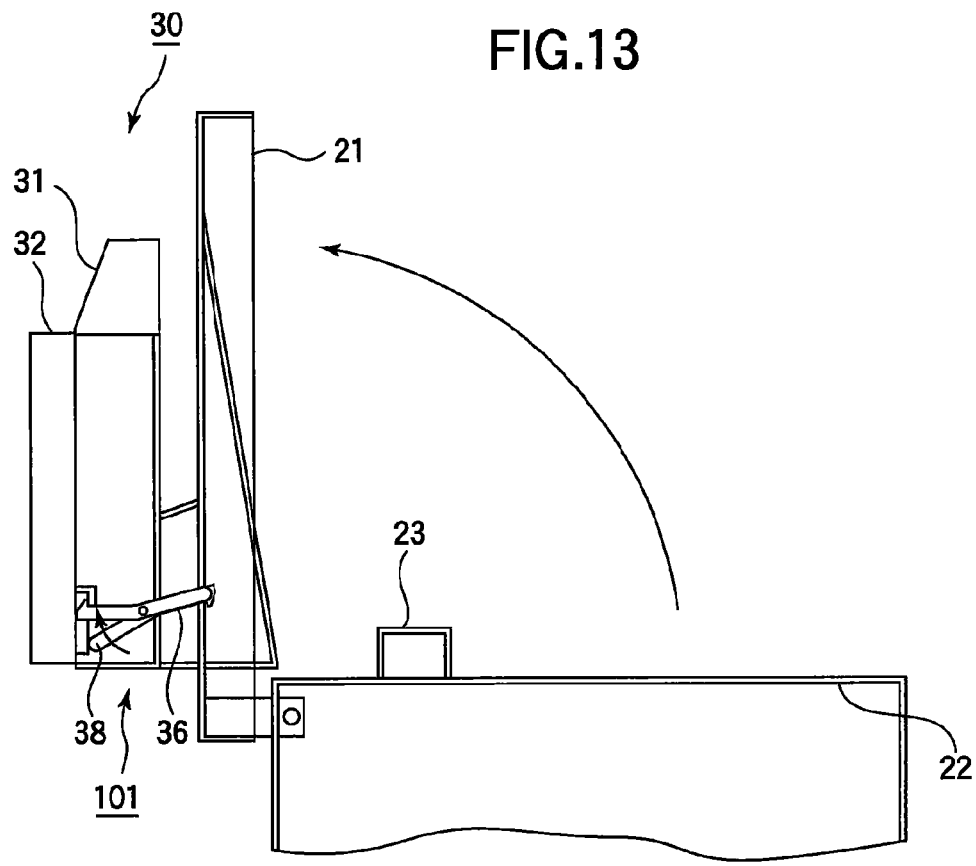
FIG. 13 illustrates the multifunction apparatus when the printer cover is opened.
Figure 14:
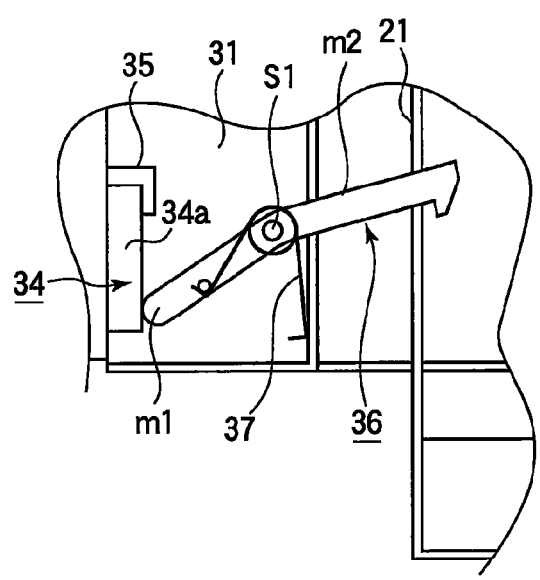
FIG. 14 illustrates the printer-locking lever when the printer cover is opened.
Figure 15:
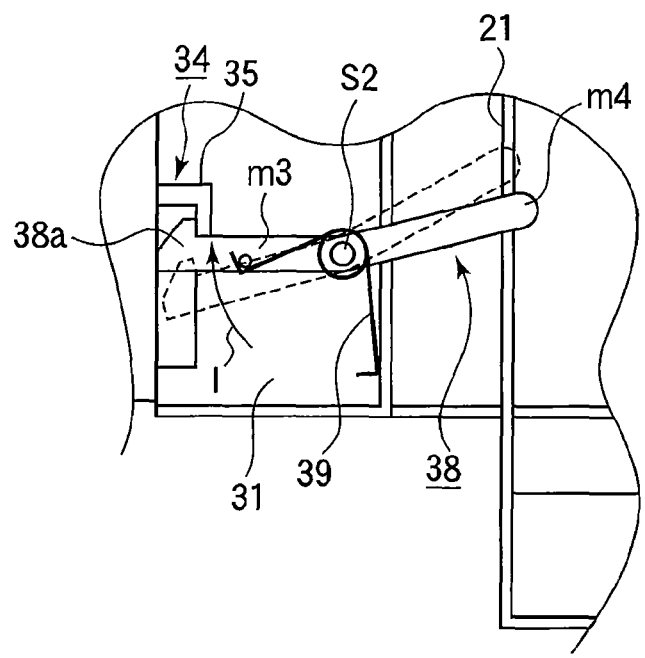
FIG. 15 illustrates the scanner locking lever when the printer cover is opened.

FIG. 13 illustrates the multifunction apparatus when the printer cover is opened completely. FIG. 14 illustrates the printer-locking lever when the printer cover is opened completely. FIG. 15 illustrates the scanner locking lever when the printer cover is opened completely.

When the operator opens the printer cover 21 for maintenance of the printer 10 as shown in FIG. 13, the free end of the second bar m4 of the scanner-locking lever 38 disengages from the abutment portion 23a as shown in FIG. 15. The urging force of the spring 39 causes the scanner-locking lever 38 to rotate in a direction shown by arrow I until the hook 38a engages the engagement piece 35. As a result, the scanner cover 32 is locked. At this moment, the first bar m1 of the printer-locking lever 36 remains in abutment engagement with the abutment portion 34a of the engagement member 34.

As described above, opening the scanner cover 32 causes the hook 36a to engage the engagement piece 23a so that the printer cover 21 cannot be opened. Therefore, prior to the maintenance of the printer 10, the scanner cover 32 is opened, then the original is removed from the flat bed of the scanner body 31, and finally the scanner cover 32 is closed so that the hook 36a moves out of engagement with the engagement piece 23a. Then, the printer cover 21 is ready to be opened.

Rotating the printer cover 21 in the opening direction, the hook 38a disengages from the engagement piece 35, so that the scanner cover 32 remains closed. The aforementioned operation of the opening/closing restricting mechanism 101 improves the maintenance efficiency of the printer 10, especially when the scanner 31 is equipped with the ADF 33 and the scanner 31 is large in size.

As described above, one of the printer cover 21 and the scanner cover 32 is opened, the other of the printer cover 21 and the scanner cover 32 remains locked. Thus, the configuration eliminates operator interventions to lock and unlock the printer cover and the scanner cover manually, providing user friendliness.

Second Embodiment

Elements similar to those in the first embodiment have been given the same reference numerals and their description is omitted.

Figure 16:
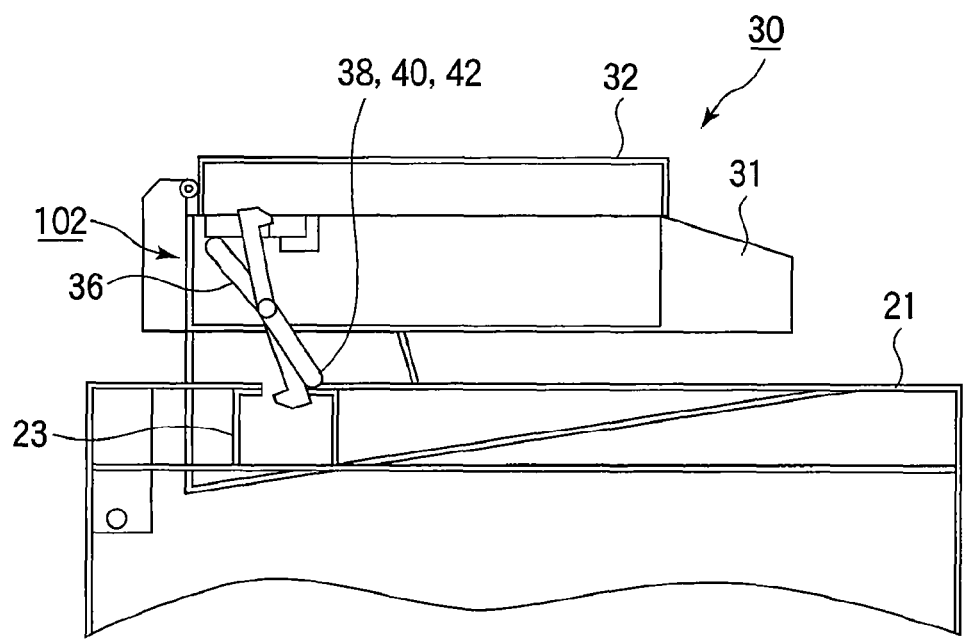
FIG. 16 illustrates a multifunction apparatus of a second embodiment when a scanner cover and a printer cover are closed.
Figure 17:
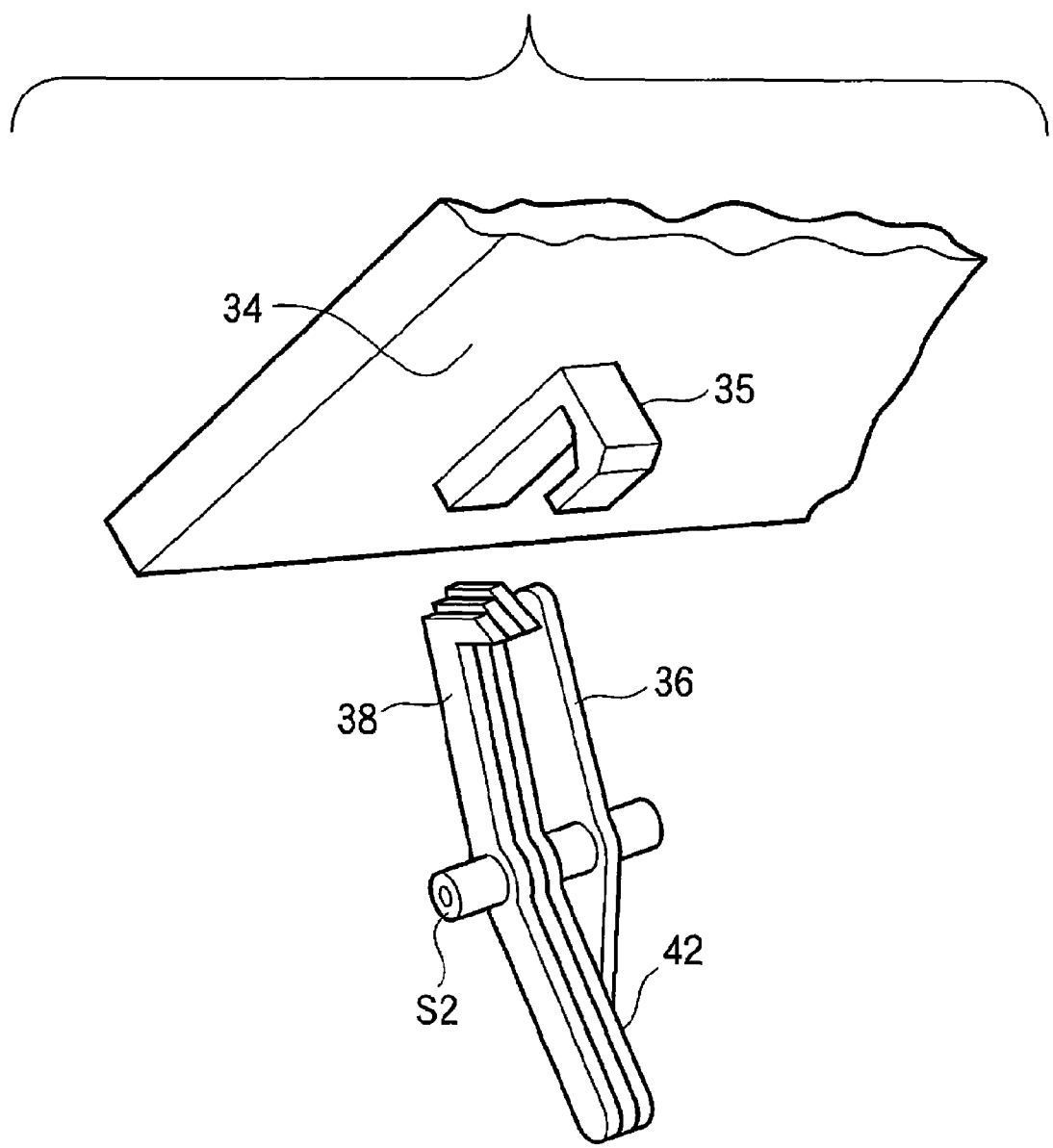
FIG. 17 is a perspective view of a scanner-locking lever when the scanner cover is opened.
Figure 18:
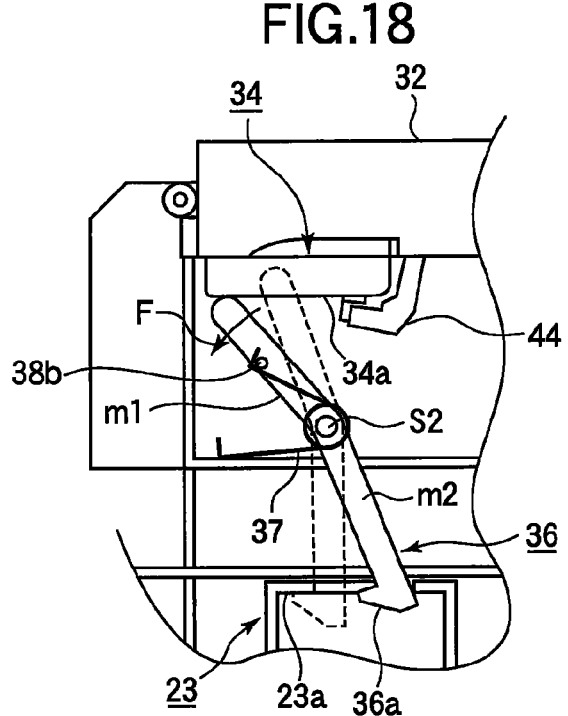
FIG. 18 illustrates a general configuration of a printer-locking lever.
Figure 19:
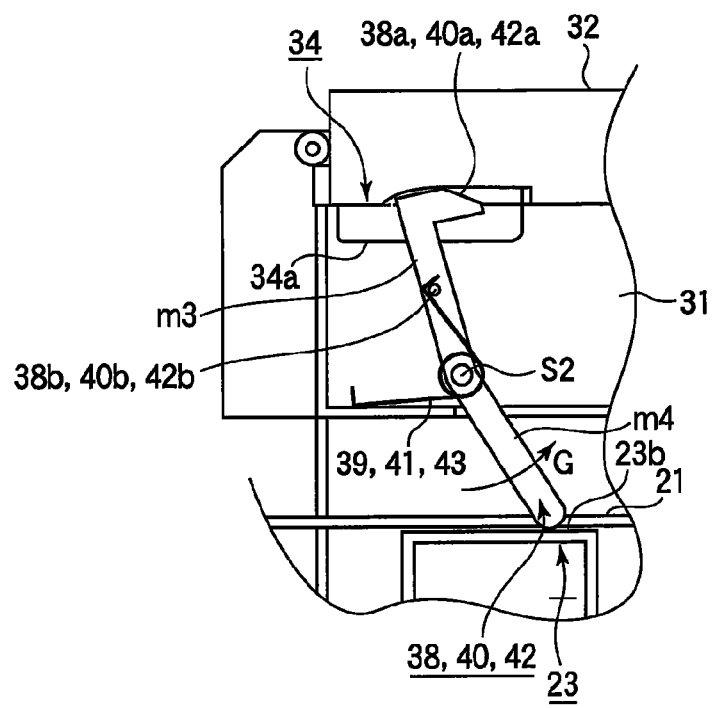
FIG. 19 illustrates a general configuration of printer-locking levers.

FIG. 16 illustrates a multifunction apparatus when a scanner cover 32 and a printer cover 21 are closed. FIG. 17 is a perspective view of a scanner-locking lever when the scanner cover is opened. FIG. 18 illustrates a general configuration of a printer-locking lever 36. FIG. 19 illustrates a general configuration of printer-locking levers 38, 40, and 46.

An opening/closing restricting mechanism 102 includes the printer-locking lever 36 and first, second, and third scanner-locking levers 38, 40, and 46 which are rotatable about a shaft S2.

Referring to FIG. 19, the scanner locking lever 38, 40, and 46 are pivotally mounted to the scanner body 31. The scanner locking lever 38, 40, and 46 each includes a first bar m3 and a second bar m4 that form an obtuse angle with each other. The scanner locking levers 38, 40, and 46 include hooks 38a, 40a, and 42a, respectively. An engagement piece 44 is formed separate or in one piece construction with the scanner cover 32. When the scanner-locking lever 38 rotates about the shaft S2, the hooks 38a, 40a, and 42a engage and disengage from the engagement piece 44 formed adjacent an abutment portion 34a.

Torsion springs 39, 41, and 43 fit over the shaft S2 and each have one end engaging the bottom of the scanner body 31 and another end engaging a projection 38b, 40b, or 42b of the first bar m3 of the scanner-locking lever 38, 40, or 42. The springs 39, 41, and 43 urge the scanner-locking lever 38, 40, and 42 in a direction opposite to a direction shown by arrow G, causing the hooks 38a, 40a, and 42a to engage the engagement piece 44.

The engagement piece 44 includes three stepped surfaces. When the scanner cover 32 is rotated in the opening direction, if the angle formed by the scanner cover 32 and the flat bed is about 0 degrees, a first one of the surfaces engages the hook 38a. When the scanner cover 32 is rotated in the opening direction, if the angle formed by the scanner cover 32 and the flat bed is about 5 degrees, a second one of the surfaces engages the hook 40a. When the scanner cover 32 is rotated in the opening direction, if the angle formed by the scanner cover 32 and the flat bed is about 10 degrees, a third one of the surfaces engages the hook 42a.

{Operation}

The operation of the opening/closing restricting mechanism 102 will be described.

When the multifunction apparatus is ready for normal use, the scanner cover 32 and the printer cover 21 are closed. At this moment, the free end of the first bar m1 of the printer-locking bar 36 is in engagement with the abutment portion 34a of the engagement piece 34, so that the hook 36a of the printer-locking lever 36 is out of engagement with the engagement piece 23a. Referring to FIG. 19, the free end of the second bar m4 of the scanner-locking lever 38 is in engagement with the abutment portion 23b of the engagement member 23 so that the hooks 38a, 40a, and 42a are out of engagement with the engagement piece 44.

When the user opens the scanner cover 32, the abutment portion 34a disengages from the free end of the first bar m1 of the printer-locking lever 36, the urging force of the spring 37 causing the printer-locking lever 36 to rotate in a direction opposite to a direction shown by arrow F so that the hook 36a engages the engagement piece 23a.

{Thin Original}

A description will be given of the operation of the opening/closing restricting mechanism 102 when a relatively thin original is placed.

Figure 20:
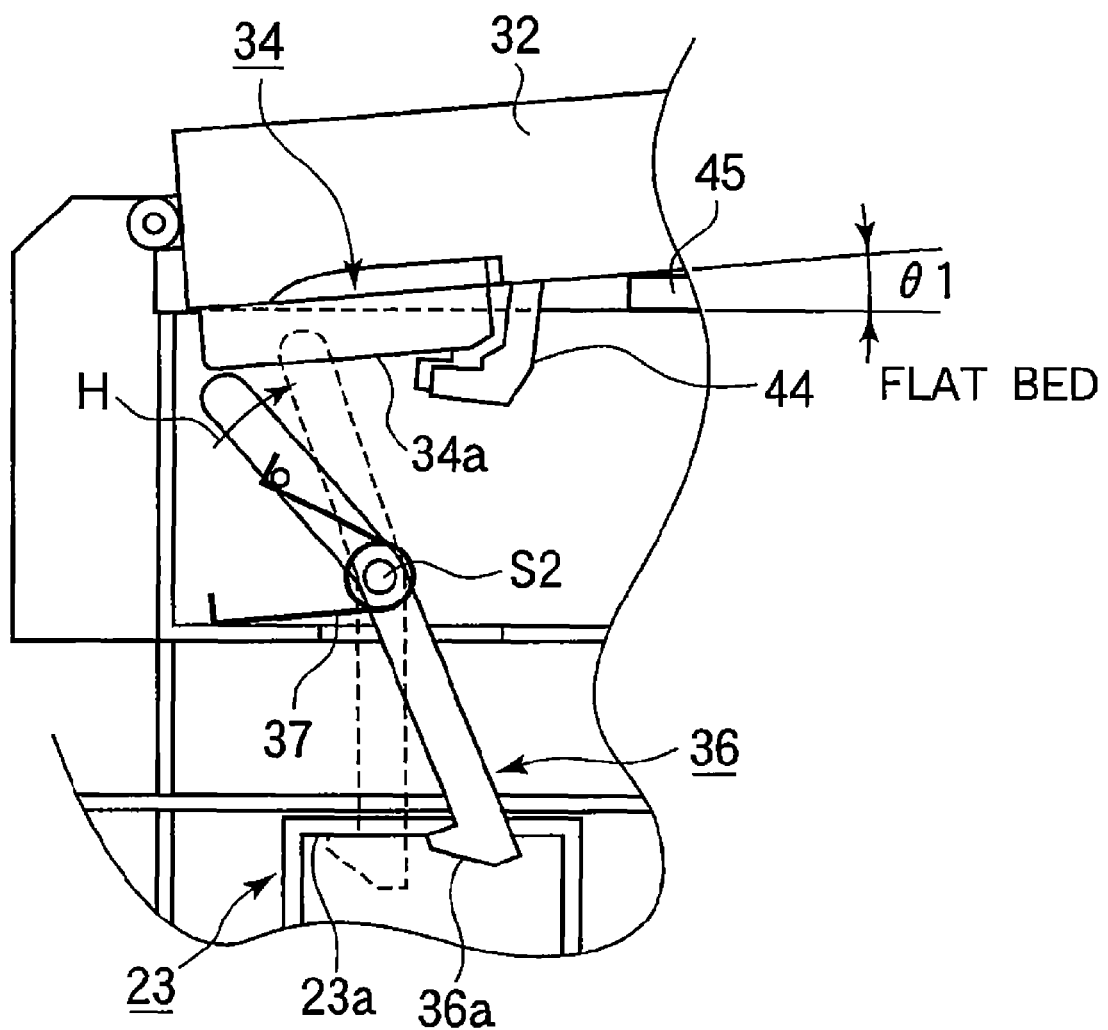
FIG. 20 illustrates the multifunction apparatus when the scanner cover is opened through a predetermined angle.
Figure 21:
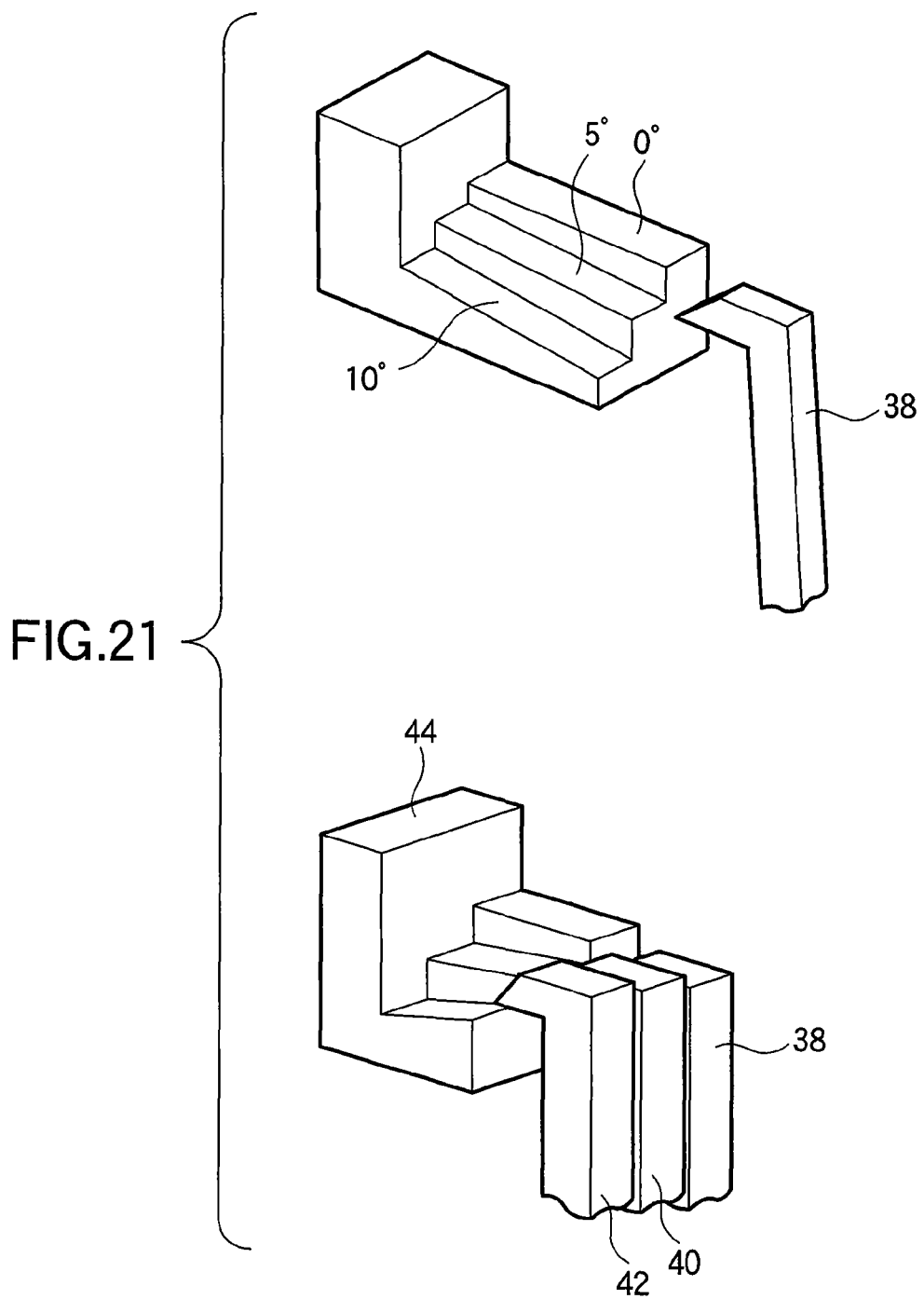
FIG. 21 is a perspective view of an engagement piece.
Figure 22:
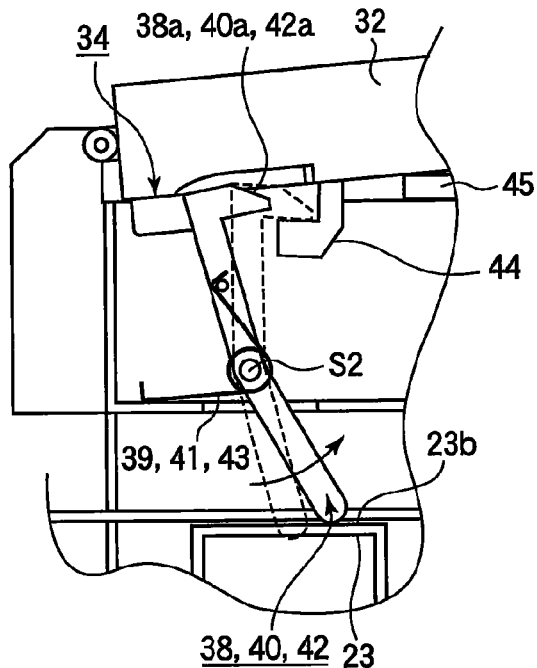
FIG. 22 illustrates the scanner-locking lever when a relatively thin original is placed on a flat bed.
Figure 23:
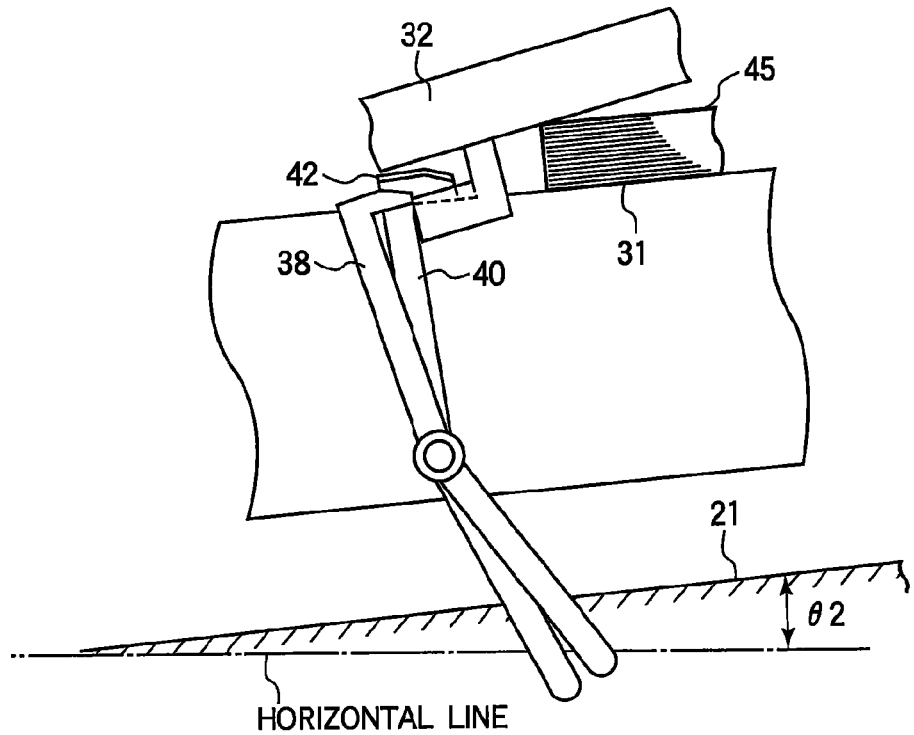
FIG. 23 illustrates the scanner locking levers when the printer cover 21 is opened through an angle after the relatively thin original is placed on the flat bed.

FIG. 20 illustrates the printer-locking lever 36 when a relatively thin original 45 is placed on the flat bed. FIG. 21 is a perspective view of the engagement piece 44 and the scanner-locking levers 38, 40, and 42. FIG. 22 illustrates the scanner-locking lever 38, 40, and 42 when a relatively thick original 45 is placed on the flat bed. FIG. 23 illustrates the multifunction apparatus when the printer cover 21 is opened through an angle with the relatively thin original sandwiched between the scanner cover 32 and the flat bed of the scanner body 31.

Referring to FIG. 20, an original 45 has a thickness of, for example, 7 mm. The scanner cover 32 forms an angle θ1 of about 5 degrees with the flat bed, so that the hook 36a is still out of engagement with the engagement piece 23a as shown in FIG. 20. At this moment, the hook 38a, 40a, and 42a are still out of engagement with the engagement piece 44 as shown in FIG. 22.

A description will be given of the operation of the opening/closing restricting mechanism 102 when the printer cover of the printer 10 is opened with the original 45 remaining on the flat bed.

Figure 24:
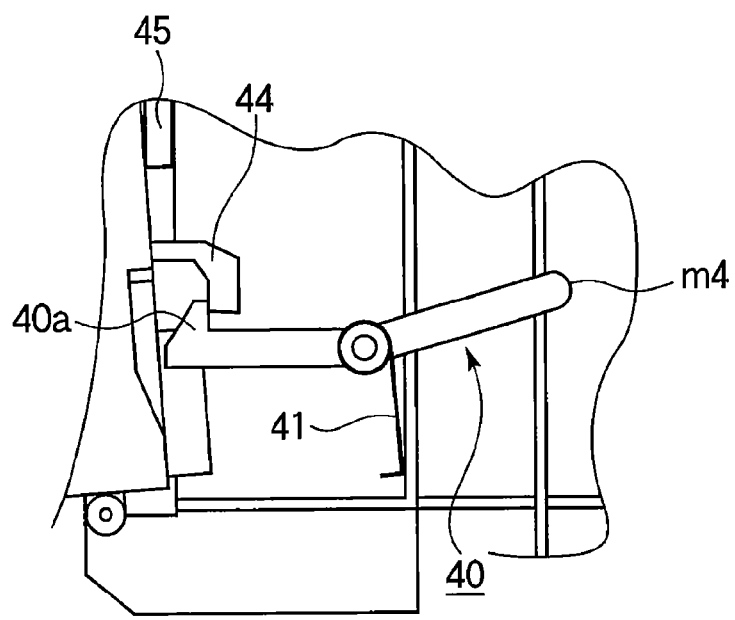
FIG. 24 illustrates the scanner-locking lever when the printer cover is opened completely after the original is placed on the flat bed.
Figure 25:
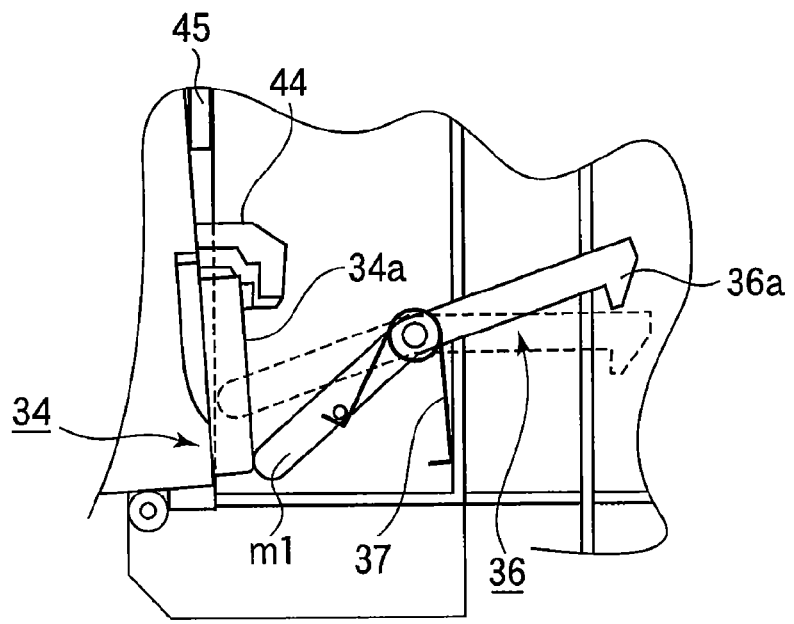
FIG. 25 illustrates the printer-locking lever when the printer cover is opened completely after the original is placed on the flat bed.

The scanner cover 32 forms an angle of about 5 degrees with the flat bed when the original 45 having a thickness of about 5 mm is placed on the flat bed. As shown in FIG. 23, when the printer cover 21 is opened through an angle θ2, the hook 40a of the scanner locking-lever 40 firmly engages a corresponding stepped portion of the engagement piece 44. It is to be noted that the hook 38a does not engage a corresponding stepped portion of the engagement piece 44 but abuts an outer surface of the engagement piece 44. It is also to be noted that there is a small gap between the hook 42a and a corresponding stepped portion of the engagement piece 44 so that the hook 42a is in an idle state. Completely opening the printer cover 21 as shown in FIG. 24 causes the free ends of the second bars m4 of the scanner-locking levers 38, 40, and 42 disengage from the abutment portion 23b. Only the hook 40a of the scanner-locking lever 40 engages the engagement piece 44 to lock the scanner cover 32, the scanner-locking levers 38 and 42 not contributing to the locking of the scanner cover 32. Thus, the scanner cover 32 remains closed, preventing the original 45 from dropping from the flat bed. At this moment, the scanner-locking levers 38 and 42 do not engage the hooks 38a and 42a, respectively. As shown in FIG. 25, the free end of the first bar m1 of the printer-locking lever 36 engages the abutment portion 34a so that the hook 36a remains out of engagement with the engagement piece 23a.

FIG. 24 illustrates the scanner-locking lever 38 when the printer cover 21 is opened completely after the scanner cover 32 has been opened through the angle. FIG. 25 illustrates the printer-locking lever 36 when the printer cover 21 is opened completely after the scanner cover has been opened.

{Thick Original}

The operation of the opening/closing restricting mechanism 102 when a relatively thick original is placed will be described.

Figure 26:
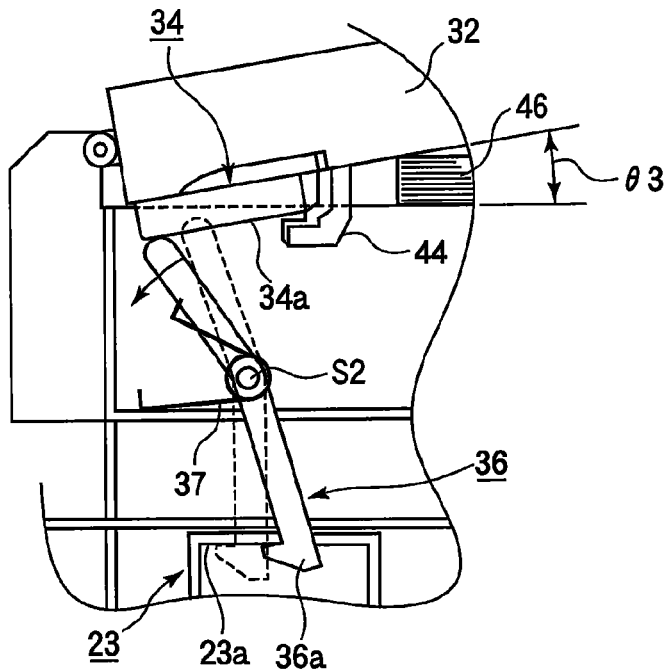
FIG. 26 illustrates the printer-locking lever when the relatively thick original is placed on the flat bed.
Figure 27:
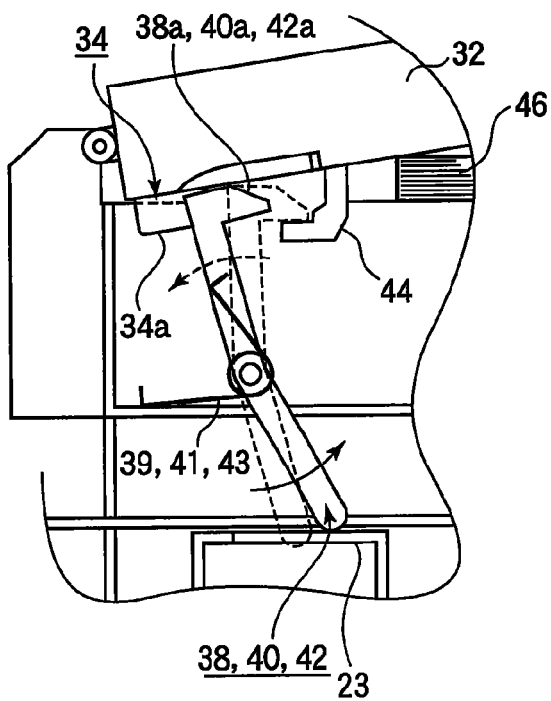
FIG. 27 illustrates the scanner-locking lever when the relatively thick original is place don the flat bed.
Figure 28:
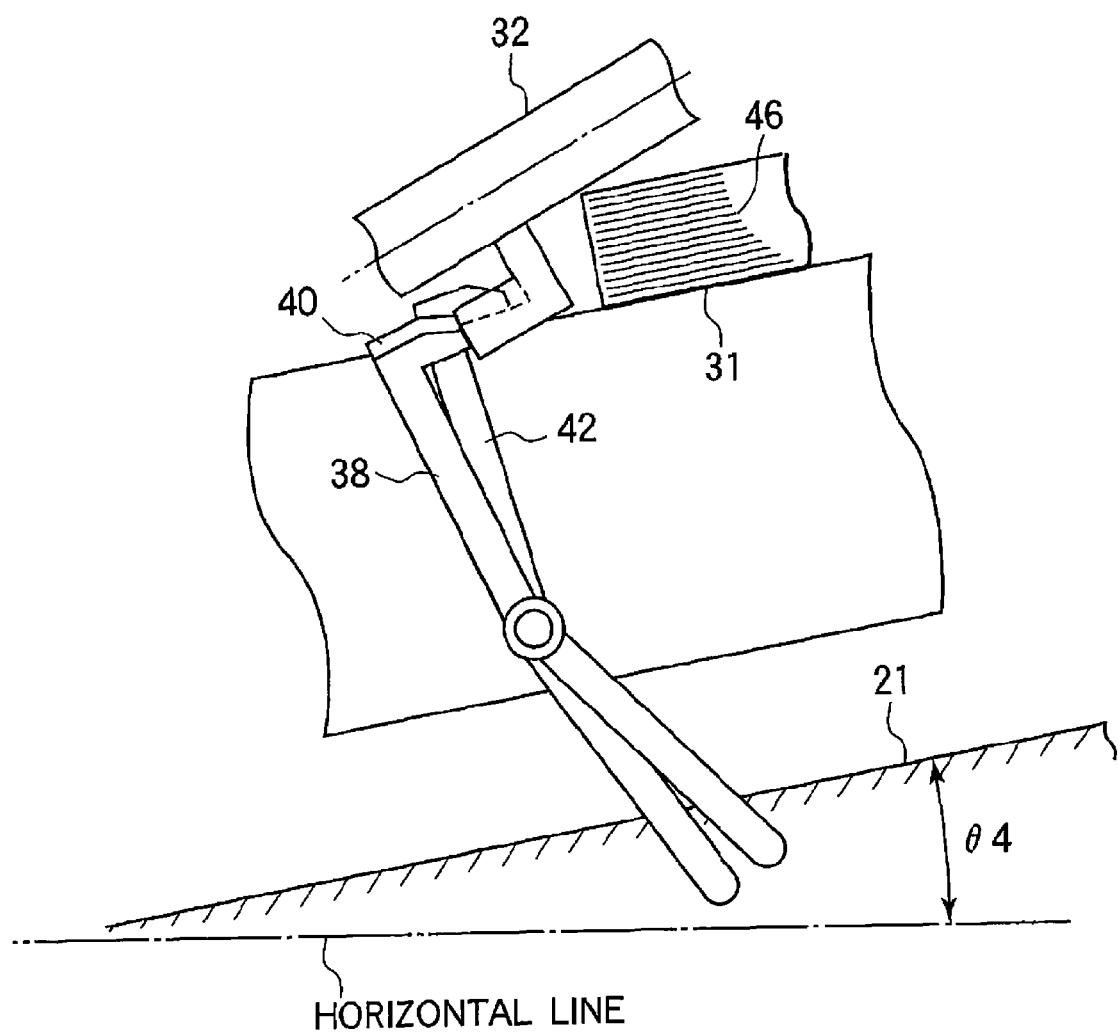
FIG. 28 illustrates the scanner-locking levers when the printer cover 21 is opened through an angle after the relatively thick original is placed on the flat bed.

FIG. 26 illustrates the printer-locking lever when an original 46 is placed on the flat bed. FIG. 27 illustrates the scanner-locking lever when an original 46 is placed on the flat bed. FIG. 28 illustrates the scanner locking levers 38, 40, and 42 when the printer cover 21 is opened through an angle after the original 46 is placed on the flat bed.

Referring to FIG. 26, an original 46 has a thickness of, for example, 15 mm, and the scanner cover 32 forms an angle θ3, of for example, 10 degrees with the flat bed, so that the hook 36a of the printer-locking lever 36 remains out of engagement with the engagement piece 23a as shown by solid lines. The hooks 38a, 40a, and 42a of the scanner-locking levers 38, 40, and 42, respectively, are out of engagement with the engagement piece 44 as shown by solid lines in FIG. 27.

A description will be given of the operation of the opening/closing restricting mechanism 102 when the printer cover 21 is opened with the original 46 remaining on the flat bed.

Figure 30:
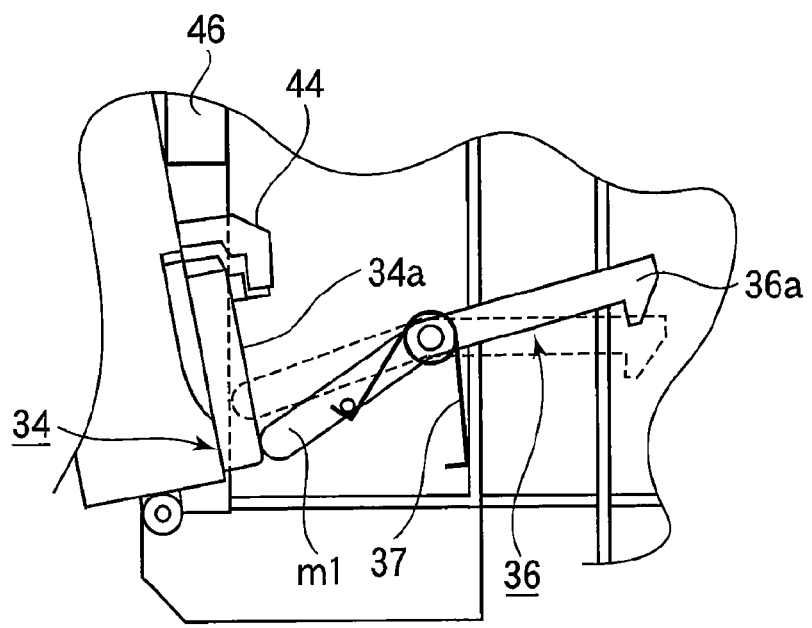
FIG. 30 illustrates the printer-locking lever when the printer cover is completely opened.
Figure 31:
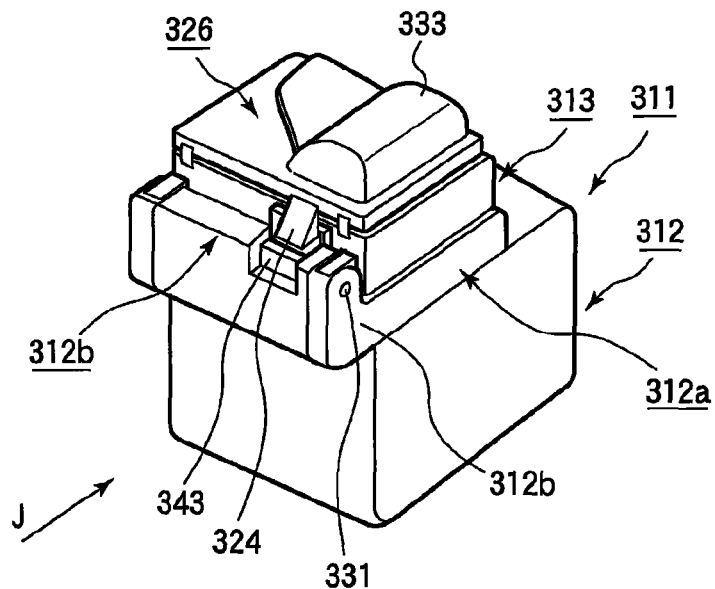
FIG. 31 is a perspective view illustrating a multifunction apparatus.

The scanner cover 32 forms an angle of about 10 degrees with the flat bed when the original 46 having a thickness of about 15 mm is placed on the flat bed. As shown in FIG. 28, when the printer cover 21 is opened through an angle θ4, only the hook 42a of the scanner locking lever 42 firmly engages a corresponding stepped portion of the engagement piece 44. It is to be noted that the hook 38a does not engage a corresponding stepped portion of the engagement piece 44 but abuts an outer surface of the engagement piece 44. It is also to be noted that the hooks 28a and 40a abut the outer surface of the engagement piece 44. Completely opening the printer cover 21 as shown in FIG. 30 causes the free ends of the second bars m4 of the scanner-locking levers 38, 40, and 42 disengage from the abutment portion 23b. Only the hook 42a of the scanner-locking lever 42 engages the engagement piece 44 to lock the scanner cover 32, the scanner-locking levers 38 and 40 not contributing to the locking of the scanner cover 32. Thus, the scanner cover 32 remains closed, preventing the original 46 from dropping from between the scanner cover 32 and the flat bed. At this moment, the hooks 38a and 42a of the scanner-locking levers 38 and 40 do not engage their corresponding stepped portions of the engagement piece 44. As shown in FIG. 31, the free end of the first bar m1 of the printer-locking lever 36 remains in engagement with the abutment portion 34a, so that the hook 36a remains out of engagement with the engagement piece 23a.

Figure 29:
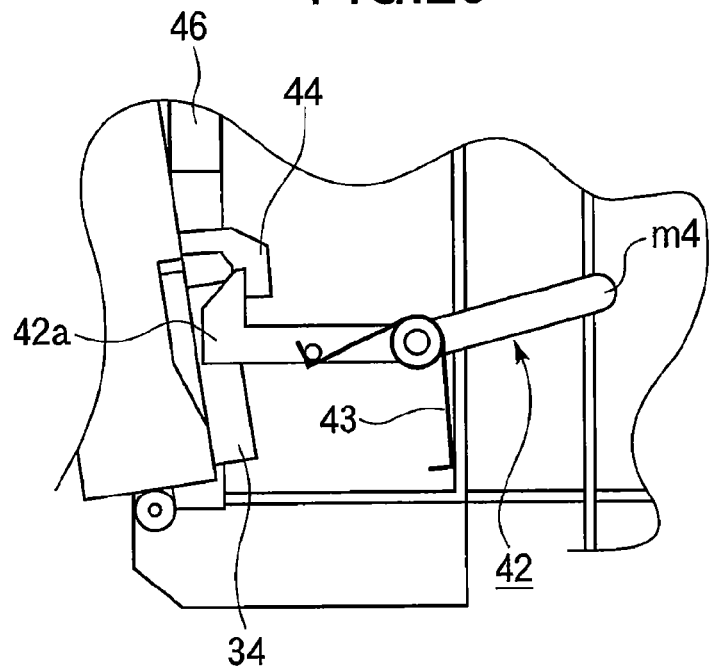
FIG. 29 illustrates the scanner-locking lever when the scanner cover is completely opened.

FIG. 29 illustrates the scanner-locking lever 42 when the scanner cover 32 is completely opened. FIG. 30 illustrates the printer-locking lever 36 when the printer cover is completely opened.

As described above, the scanner-locking levers 38, 40, and 42 are pivotal about the shaft S2 and the hooks 38a, 40a, and 42a alternately engage the engagement piece 44 in a stepwise fashion in accordance with the thickness of the original placed on the flat bed. Thus, even if the printer cover 21 is opened with the original 45 or 46 having a certain thickness remaining on the flat bed, the originals 45 or 46 are still prevented from dropping from between the flat bed and the scanner cover 32.

While the invention has been described in terms of a case in which the printer cover of the printer 10 is opened and closed together with the scanner body 31, the present invention is also applicable to a case in which the scanner body 31 and the printer cover 21 are opened or closed independently.

Although the present invention has been described with respect to a multifunction apparatus, the invention may also be applicable to a printer and a copying machine.

Third Embodiment

FIG. 31 is a perspective view illustrating the multifunction apparatus.

Figure 32:
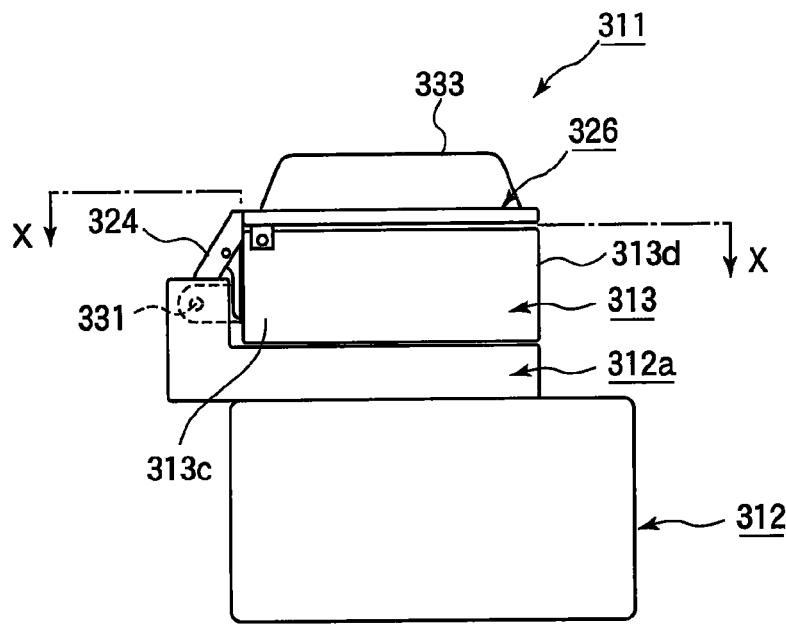
FIG. 32 is a front view of the multifunction apparatus.
Figure 33:
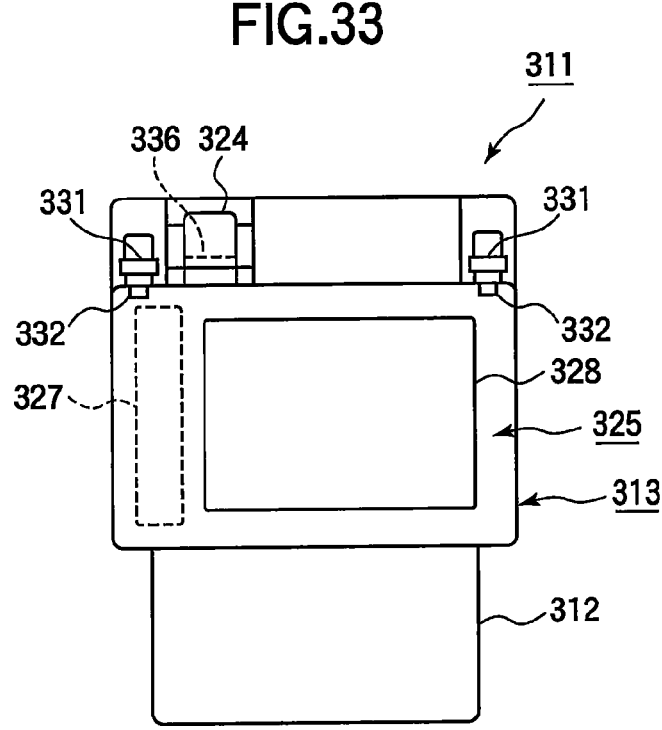
FIG. 33 is a cross-sectional view taken along a line X-X of FIG. 32.

FIG. 32 is a front view of a multifunction apparatus 311;

FIG. 33 is a top view of the multifunction apparatus 11 taken along a line X-X of FIG. 32 when a document cover 326 is removed from the apparatus.

FIG. 34 is a rear view of the multifunction apparatus as seen in a direction shown by arrow J in FIG. 31.

Referring to FIGS. 31 and 32-34, the multifunction apparatus 311 includes a printer 312 and a scanner 313. The printer 312 operates as an image forming apparatus. The scanner 313 is mounted on the printer via a stay 312a.

The printer 312 is a tandem type color image forming apparatus that forms yellow, magenta, cyan, and black images on paper, not shown. Alternatively, the printer 312 may employ another form of image forming method such as a laser type, ink jet type, or a dot impact type.

Figure 35:
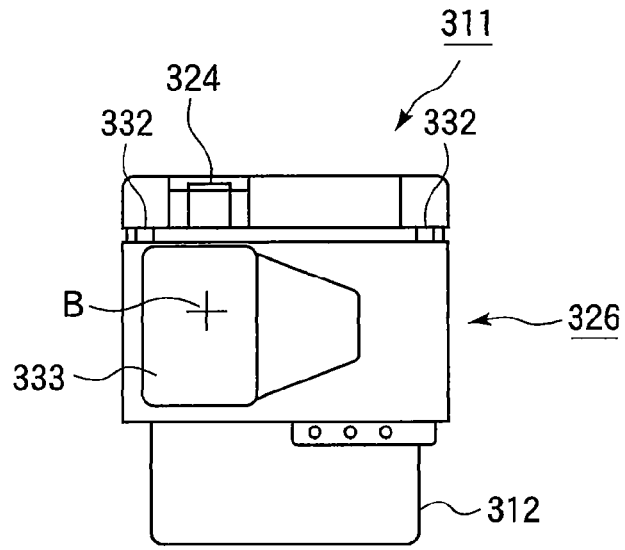
FIG. 35 is a top view of the multifunction apparatus.

FIG. 35 is a top view of the multifunction apparatus.

Because the ADF 333 is provided on the document cover 326, the center of gravity of the document cover 326 is slightly closer to the ADF 333 than a geometrical center of the document cover 326. As shown in FIG. 35, the stopper 324 is located closer to the center of gravity B than the longitudinal middle of the shaft 332, and faces the rear surface Sa of the ADF 333. In other words, the stopper 324 does not face a front surface 313d (FIG. 32), or side surfaces 313b and 313c, so that when an original having a larger size than the original reading surface 328 or flat bed 325 is placed on the flat bed, the stopper 324 is not be an obstacle to the original.

FIG. 36 is a cross sectional view of the multifunction apparatus 311. Referring to FIG. 36, each of a plurality of process cartridges 320 includes a print head (exposing unit), a transfer roller 321, a charging roller 318, a photoconductive drum 317, a developing roller (not shown), and a toner cartridge 319. A paper cassette 316 holds a stack of sheets of paper therein. A fixing unit 322 is provided downstream of the plurality of process cartridges 320.

The charging roller 318 charges the surface of the photoconductive drum 317. The print head illuminates the charged surface of the photoconductive drum 317 to form an electrostatic latent image. The developing roller supplies toner to the photoconductive drum 317 to develop the electrostatic latent image into a toner image.

The paper is fed on a sheet-by-sheet basis from the paper cassette 316 to transfer points defined between the photoconductive drum 317 and the transfer rollers. The transfer roller 321 transfers the toner image from the photoconductive drum 317 onto the paper. As the paper advances through the plurality of process cartridges 320, the toner images of the respective colors are transferred onto the paper one over the other in registration, thereby forming a full color toner image on the paper. The paper is then advanced to the fixing unit 322 where the full color toner image is fused into a permanent full color image. The paper is then discharged by a discharging unit 323 onto a stacker.

The scanner 313 includes a flat bed 325 and a document cover 326. An automatic document feeder (ADF) 333 is disposed on the document cover 326, and automatically feeds a plurality of sheets of original image into the scanner 313 on a sheet-by-sheet basis. The flat bed 25 includes a carriage 327 that is movable reciprocally along an advancing direction, and an original-reading surface 328. The carriage 327 is equipped with an image sensor unit 329. The image sensor unit 329 reads the image of an original placed on the original-reading surface 328, and converts the image into an electrical signal. Then, the image sensor unit 329 provides the electrical signal to the printer 12, which in turn prints an image in accordance with the electrical signal.

The stay 312a (FIG. 31) includes a shaft 331 about which the scanner 313 pivots. The flat bed 325 includes a shaft 332 that parallels the shaft 331 about which the document cover 326 pivots.

Figure 37:
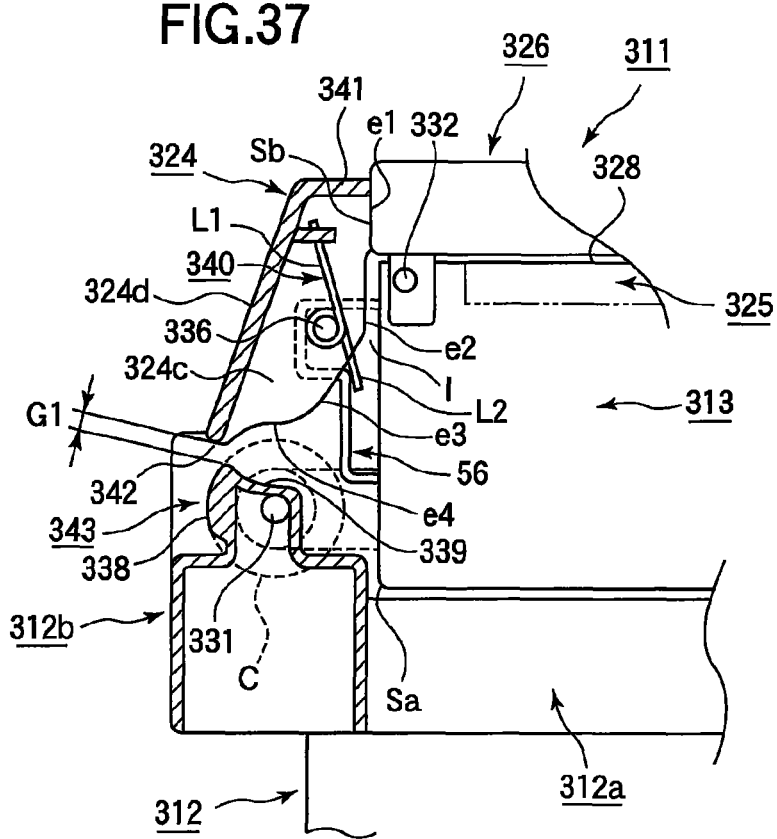
FIG. 37 illustrates a partial cross sectional side view illustrating a pertinent portion of the multifunction apparatus of a third embodiment.

FIG. 37 illustrates a partial cross sectional view illustrating a pertinent portion of a multifunction apparatus of a third embodiment.

Referring to FIG. 37, a bracket 56 is disposed on a rear end surface Sa of the scanner 313, and supports a shaft 336 that parallels the shafts 331 and 332. A stopper 324 is pivotal about the shaft 336. When the document cover 326 pivots about the shaft 332, the stopper 324 abuts the document cover 326, and rotates together with the document cover 326.

Figure 38:
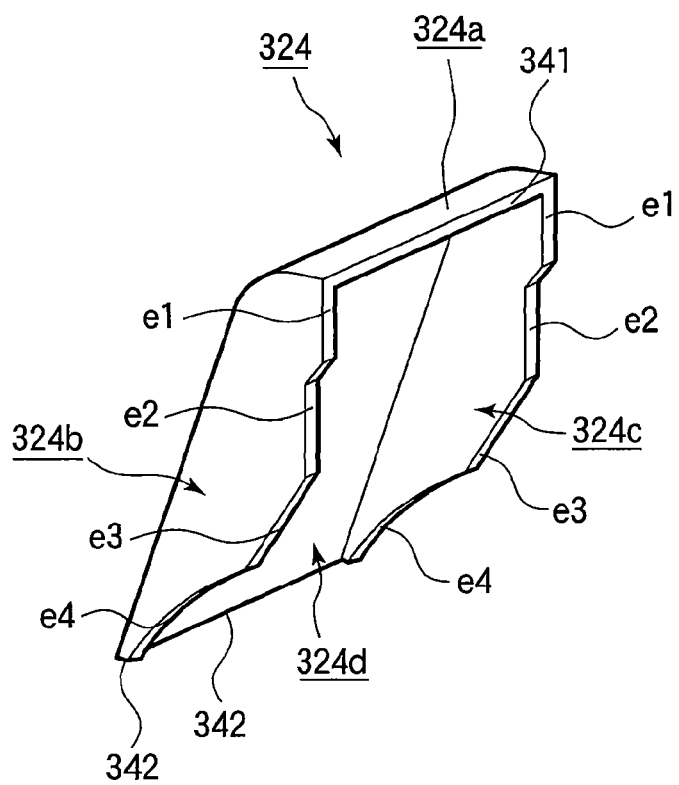
FIG. 38 is a perspective view of a stopper of the third embodiment.

FIG. 38 is a perspective view of a stopper of the third embodiment.

Referring to FIG. 38, the stopper 324 includes a top wall 324a, side walls 324b and 324c, a rear wall 324d contiguous with the top wall 324a and side walls 324b and 324c. Each of the side walls 324b and 324c includes a first side surface e1, a second side surface e2, a third side surface e3, and a fourth side surface e4 which is curved. The top wall 324a includes an abutment portion 341. The rear wall 324d includes a guide portion 342 at its end.

When the document cover 326 is rotated with the scanner 313 closed, the stopper 324 rotates relative to the scanner 313 to a first position, while being in slide contact with the document cover 326. As a result, the side surface e1 of the stopper 324 becomes in contact with the rear surface Sb and there will be a gap I between the side surface E2 and the rear surface Sb. Therefore, even if the rear surface Sa projects more rearward than the rear surface Sb, the side surfaces e2 are not in contact with the rear surface Sa, ensuring that the rear surface Sb come in contact with the abutment portion 341 and the first side surface e1.

When the document cover 326 and the scanner 313 is rotated to completely open, the stopper 324 rotates to a second position together with the scanner 313. A torsion spring 340 is provide to urge the stopper 324 against the document cover 326, ensuring that when the scanner 313 and document cover 326 are rotated, the first side surface e1 is in contact with the rear surface Sb of the document cover 326. The torsion spring 340 has one end L1 fastened to the rear wall 324d and another end L2 engaging the bracket 356, and urges the stopper 324 clockwise in FIG. 37.

Referring back to FIG. 31, the stay 312a is generally L-shaped and includes a rear end member 312b that is vertically oriented. The rear end member 312b includes a support 343 (FIGS. 37 and 31) projecting upward toward the stopper 324. The support 343 guides a guide portion 342, and prevents the stopper 324 from further rotating about the shaft 336 after the stopper 324 has rotated through an angle. For this purpose, a support surface 338 is formed on the rear end of the support 343. The support surface 338 lies in a cylindrical plane C about the shaft 331. The support surface 338 will be described in more detail later.

The stopper 324 and support 343 serves as a rotation limiter.

Referring back to FIG. 37, when the scanner 313 rotates about the shaft 331, the stopper 324 rotates together with the scanner 313, the guide portion 342 and the fourth side surfaces e4 slide on the support surface 338. For this purpose, the fourth side surface e4 is an arcuate surface configured to the cylindrical surface of the support surface 338, facilitating smooth movement of the stopper 324. The support 343 has a concave surface 339 on its top.

As described above, as the scanner 313 rotates about the shaft 331, the guide portion 342 slides on the support surface 338, so that the stopper 324 does not rotate with respect to the document cover 326. Therefore, when the scanner 313 is rotated, the document cover 326 is prevented from rotating such that the document cover 326 remains closed.

Referring back to FIG. 37, when the scanner 313 is closed with respect to the printer 312 and the document cover 326 is closed with respect to the scanner 313, there is a gap G1 in the range of 1.0 to 1.5 mm between the guide portion 342 and the support 343.

The operation of the multifunction apparatus 311 will be described.

Figure 39:
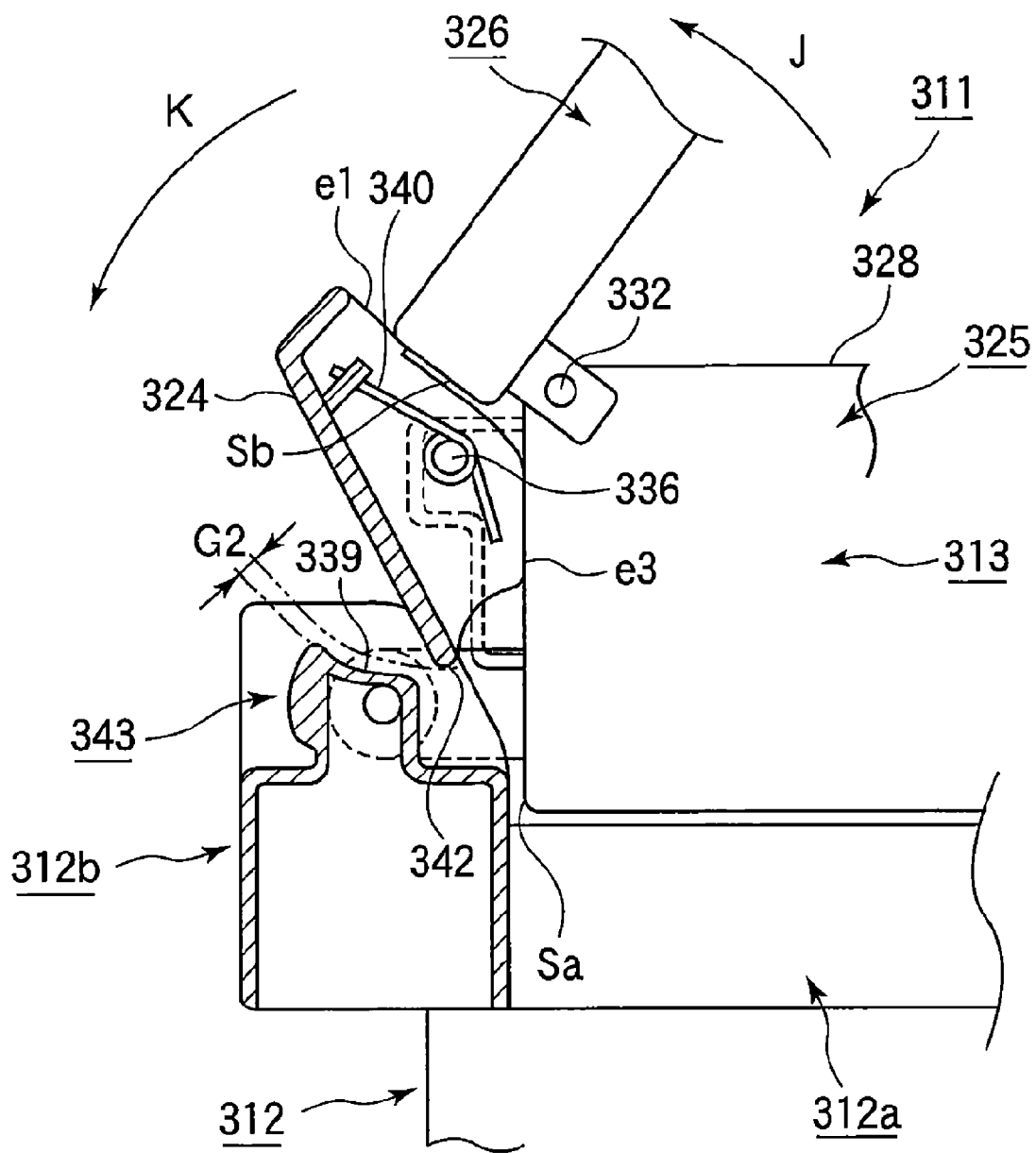
FIG. 39 is a first figure illustrating the operation of the multifunction apparatus.

FIG. 39 is a first figure illustrating the operation of the multifunction apparatus.

When a user rotates the document cover 326 about the shaft 332 in an opening direction J, the stopper 324 is pushed by the document cover 326, so that the stopper 324 is rotated counterclockwise (arrow K) about the shaft 336 with the first side surface e1 in contact with the rear surface Sb of the document cover 326 as shown in FIG. 39. As a result, the guide portion 342 faces the concave surface 339 while maintaining the gap G1 between the guide portion 342 and the concave surface 339, and rotates along the locus shown in dot-dot dash line. When the third side surface e3 abuts the rear surface Sa of the scanner 313, the document cover 326 is prevented from rotating any further. The rear surface Sa functions as a stopper against the rotation of the document cover 326.

Figure 40:
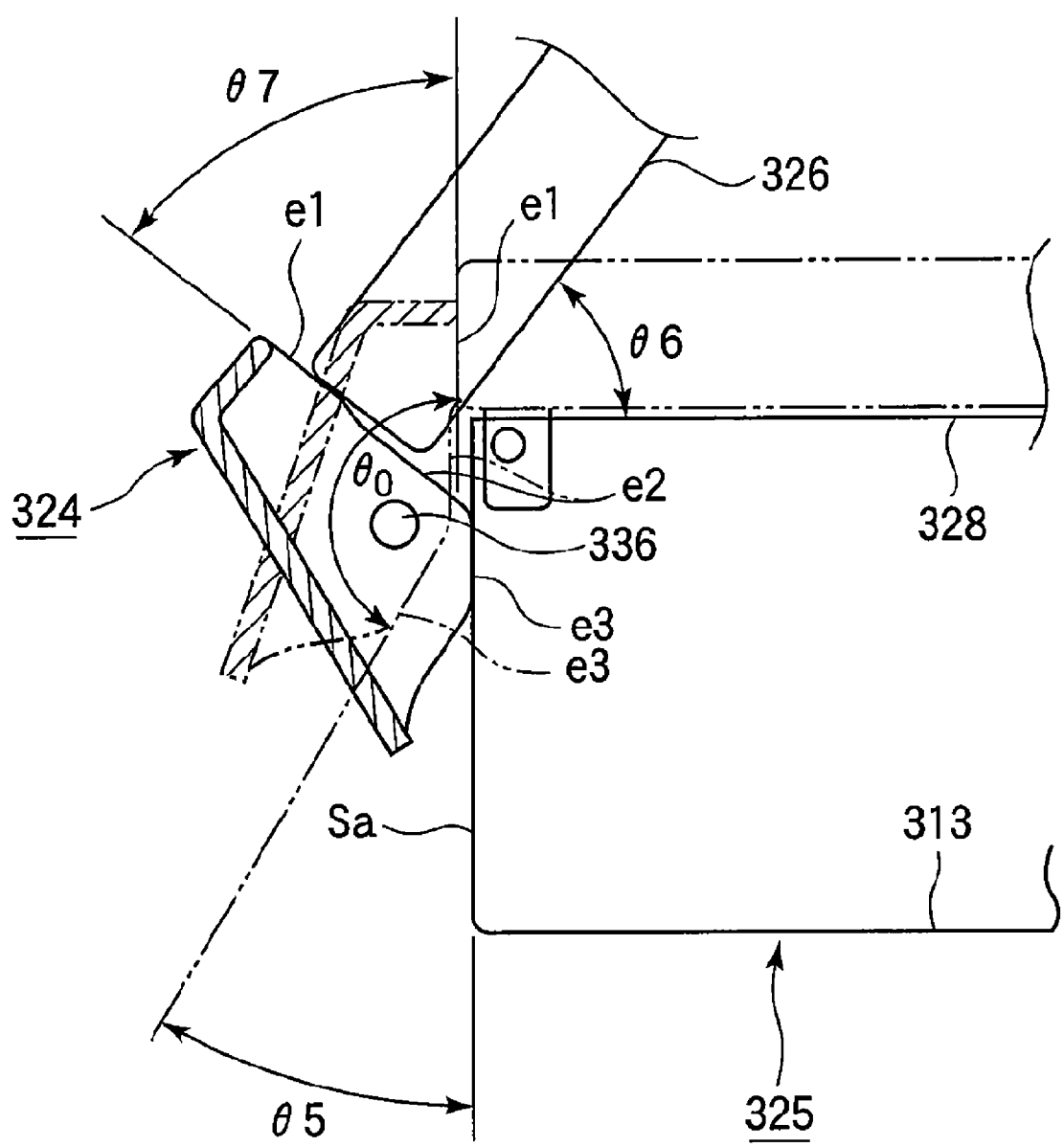
FIG. 40 is an enlarged view of FIG. 39 illustrating the operation of the stopper.
Figure 41:
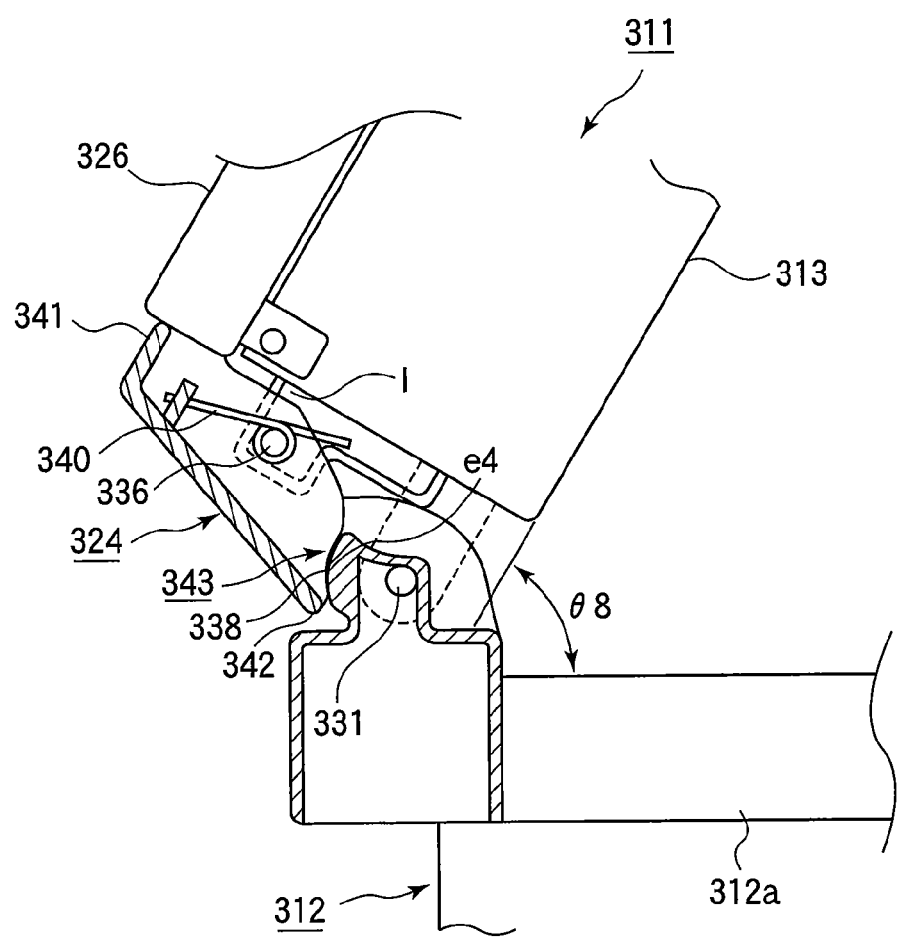
FIG. 41 is a second figure illustrating the operation of the multifunction apparatus.

FIG. 40 is an enlarged view of FIG. 40 illustrating the operation of the stopper. FIG. 40 is a second figure illustrating the operation of the multifunction apparatus.

Referring to FIG. 40, the stopper 324 is either at a home position shown in dot-dot dash lines or at an opened position shown in solid lines.

When the stopper 324 is at the home position, the third side surface e3 forms an angle $\theta 5$ with the rear surface Sa such that $\theta 5 = 180 - \theta 0$ degrees where $\theta 0$ is an angle formed between the first side surface e1 and the third side surface e3.

When the stopper 324 is at the opened position, the first side surface e1 forms an angle $\theta 7$ with the rear surface Sa, the angle θ7 being equal to an angle θ6 formed between the original reading surface 28 and the lower surface of the document cover 326.

The angle θ0 is such that the third side surface e3 comes in intimate contact with the rear surface Sa when the document cover 326 is fully opened. Consequently, the angle θ5 is equal to the angle θ7.

The angle θ0 is selected to be 115 degrees and the angles C and E are selected to be 65 degrees. In other words, the document cover 326 can be opened through an angle in the range of 0 to 65.

The angle θ5 may be selected to be larger than the angle θ7, in which case, the rear surface Sa comes in contact with the edge portion at which the second side surface e2 is contiguous with the third side surfaces e3.

When the maintenance of the printer 312 or the scanner 313 is performed, the scanner 313 is rotated about the shaft 331 to fully open.

At this moment, the stopper 324 is rotated together with the scanner 313 until the guide portion 342 and the fourth side surface e4 abut the support surface 38 and slide on the support surface 338. Thus, the stopper 324 is prevented from rotating about the shaft 36 any further so that the document cover 326 is prevented from rotating and opening relative to the scanner 313.

Figure 42:
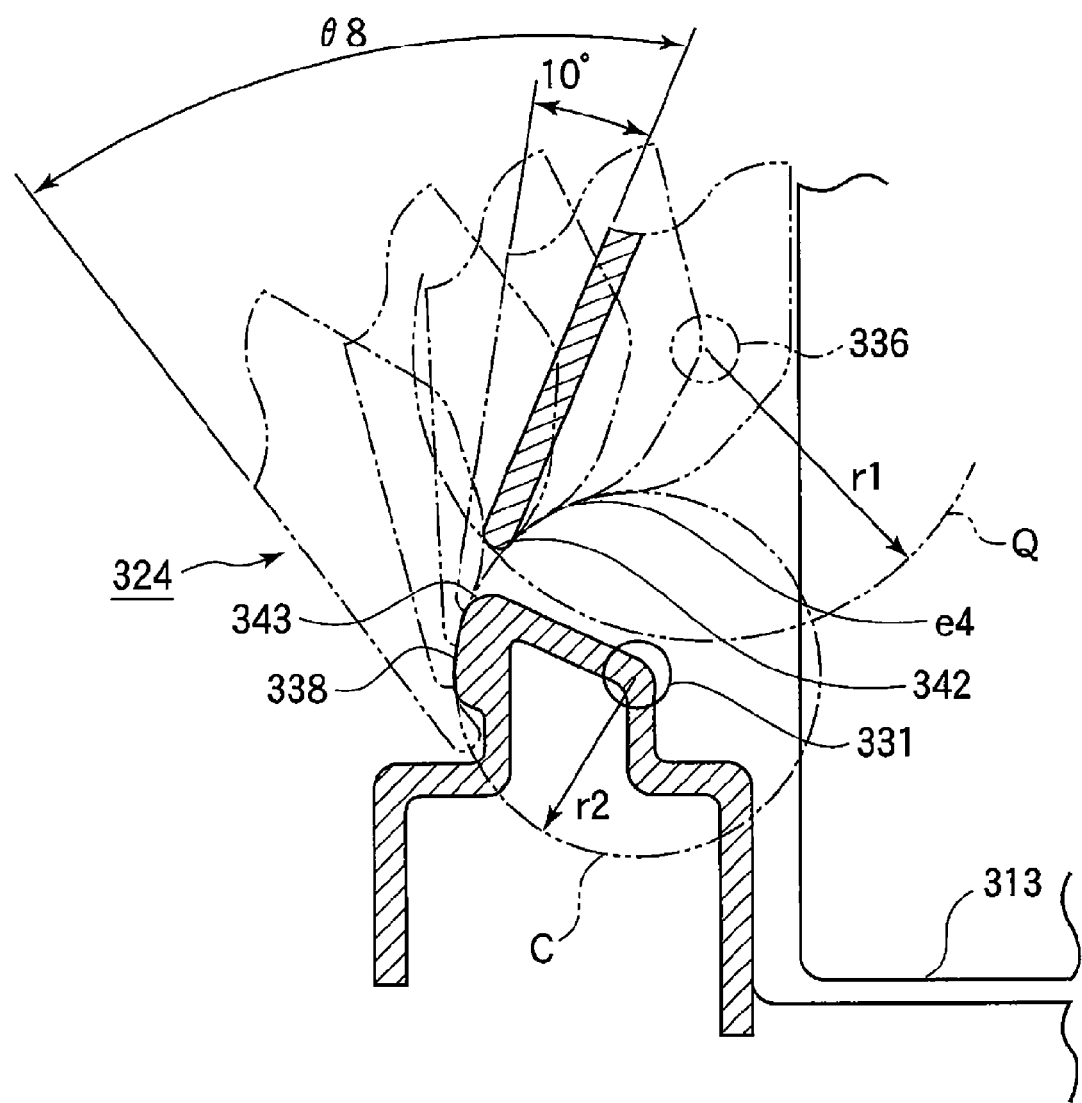
FIG. 42 illustrates the locus of the stopper.

FIG. 42 illustrates the locus of the stopper 324 when the scanner 313 is opened.

Referring to FIG. 42, when the scanner 313 is rotated through 10 degrees, the guide portion 342 becomes in contact with the support surface 38 to prevent the document cover 326 from opening (If the scanner 313 is opened through an angle less than 10 degrees, the document cover 326 will not open by its gravity). As the scanner 313 is further opened, the guide portion 342 and the fourth side surface e4 become in contact with and slide on the support surface 338. When the scanner 313 is completely opened with an angle F between the scanner 313 and the stay 312a, the stopper 324 has been rotated through the same angle F. The angle F is selected to be 65 degrees. When the scanner 13 has been completely opened, a stopper means, not shown, prevents the scanner 313 from rotating any further.

Q is the circular locus of the guide portion 342 when the scanner is rotated. There is the following relation.

$$r1 > r2$$

where r2 is a radius of a circle C and r1 is the radius of a circle Q. The r1 is selected to be 22.6 mm and r2 is selected to be 12.4 mm.

As described above, when the scanner 313 is rotated, the stopper 324 rotates together with the scanner 313 to restrict the rotation of the document cover 326, so that the document cover 326 remains closed. This not only prevents the document cover 326 from being damaged but also prevents the original sandwiched between the document cover 326 and the flat bed 325 from dropping.

Because the stopper 324 automatically restricts the rotation of the document cover 326 as the scanner 313 rotates, no human intervention is required so that the operability of the multifunction apparatus 311 is improved.

Fourth Embodiment

Elements similar to those in the third embodiment have been given the same reference numerals and their description is omitted.

Figure 43:
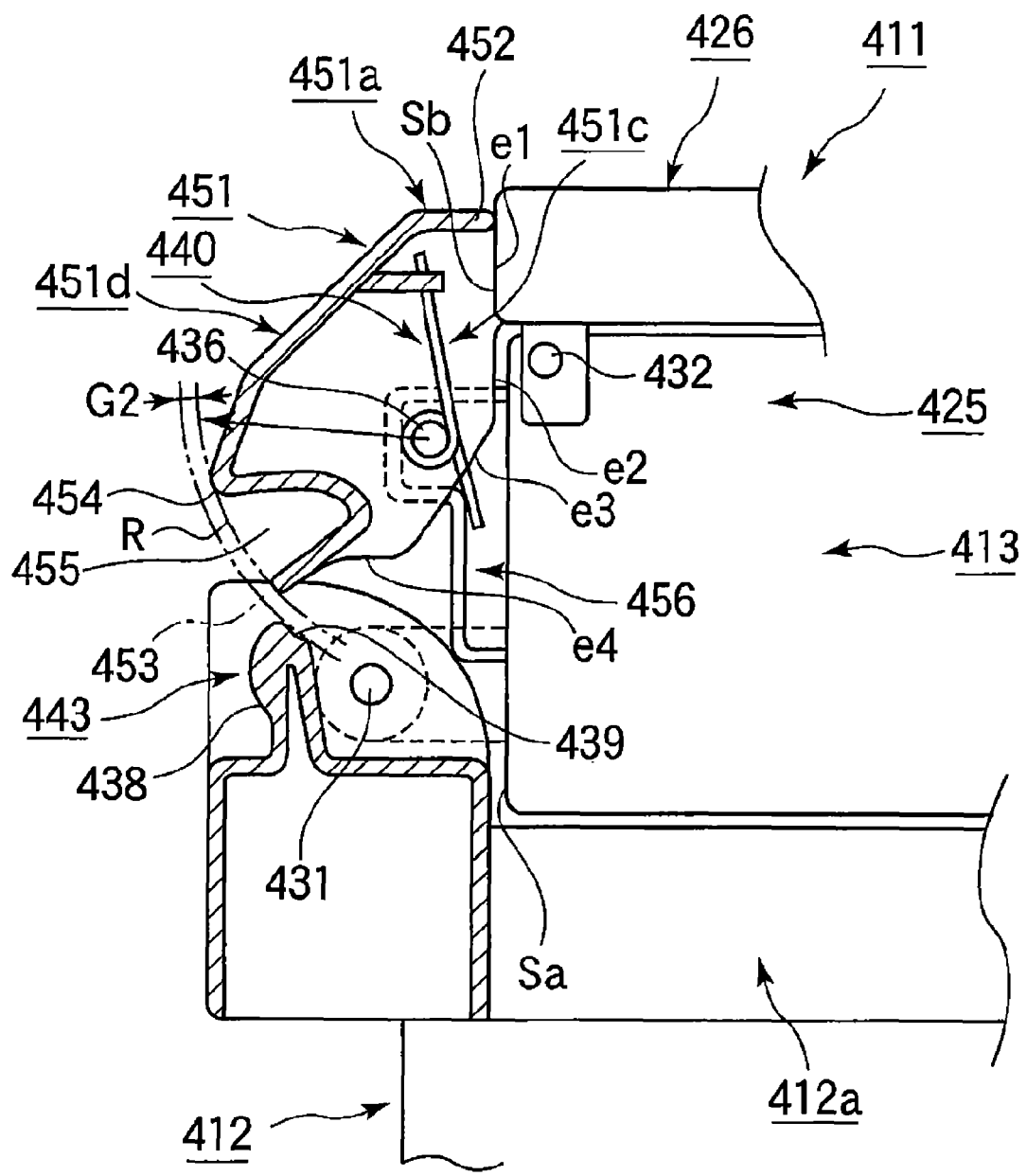
FIG. 43 is a partial cross-sectional view of a pertinent portion of a multifunction apparatus of a fourth embodiment.

FIG. 43 is a partial cross-sectional view of a pertinent portion of a multifunction apparatus of a fourth embodiment.

Referring to FIG. 43, a stopper 451 is disposed adjacent a rear end of a scanner 413. The stopper 451 is pivotal about a shaft 436, and restricts the rotation of a document cover 426.

The stopper 451 includes a top wall 451a, a rear wall 451d that is contiguous with the top wall and extends obliquely downward, and side walls between which the top wall 451a and the rear wall 451d are sandwiched. Only a side wall 451c is shown in FIG. 43. Each of the side walls includes a first side surface e1, a second side surface e2, a third side surface e3, and a fourth side surface e4 which is curved. The top wall 451a includes an abutment portion 452. A rear wall 424d includes a guide portion 453. The stopper 451 includes a recess 455 contiguous to the rear wall 451d, defining an edge portion 454. The guide portion 453 and the edge 454 lie in a cylindrical plane R with its center at the shaft 436.

When the scanner 413 is rotates, the stopper 451 rotates together with the scanner 413, so that the guide portion 453 and the fourth side surface e4 slide on the support surface 438. For this purpose, the support surface 438 lies in a cylindrical plane S (FIG. 37) about the shaft 431 and the fourth side surface e4 is configured to the support surface 438. The support 443 includes a concave surface 439 that is concentric to the cylindrical plane R about the shaft 436, defining a partially cylindrical gap G2 between the surface 439 and the cylindrical plane R.

As the scanner 413 is rotated, the guide portion 453 slides on the support surface 438, so that stopper 451 will not rotate relative to the scanner 413. This operation prevents the document cover 426 from rotating to open during the rotation of the scanner 413.

When the scanner 413 is closed with respect to the printer 412, the document cover 426 is at its closed position with respect to the scanner 413, defining a gap G1 in the range of 1.0 to 1.5 mm between the guide portion 453 and support 443.

The operation of the multifunction apparatus 411 will be described.

Figure 44:
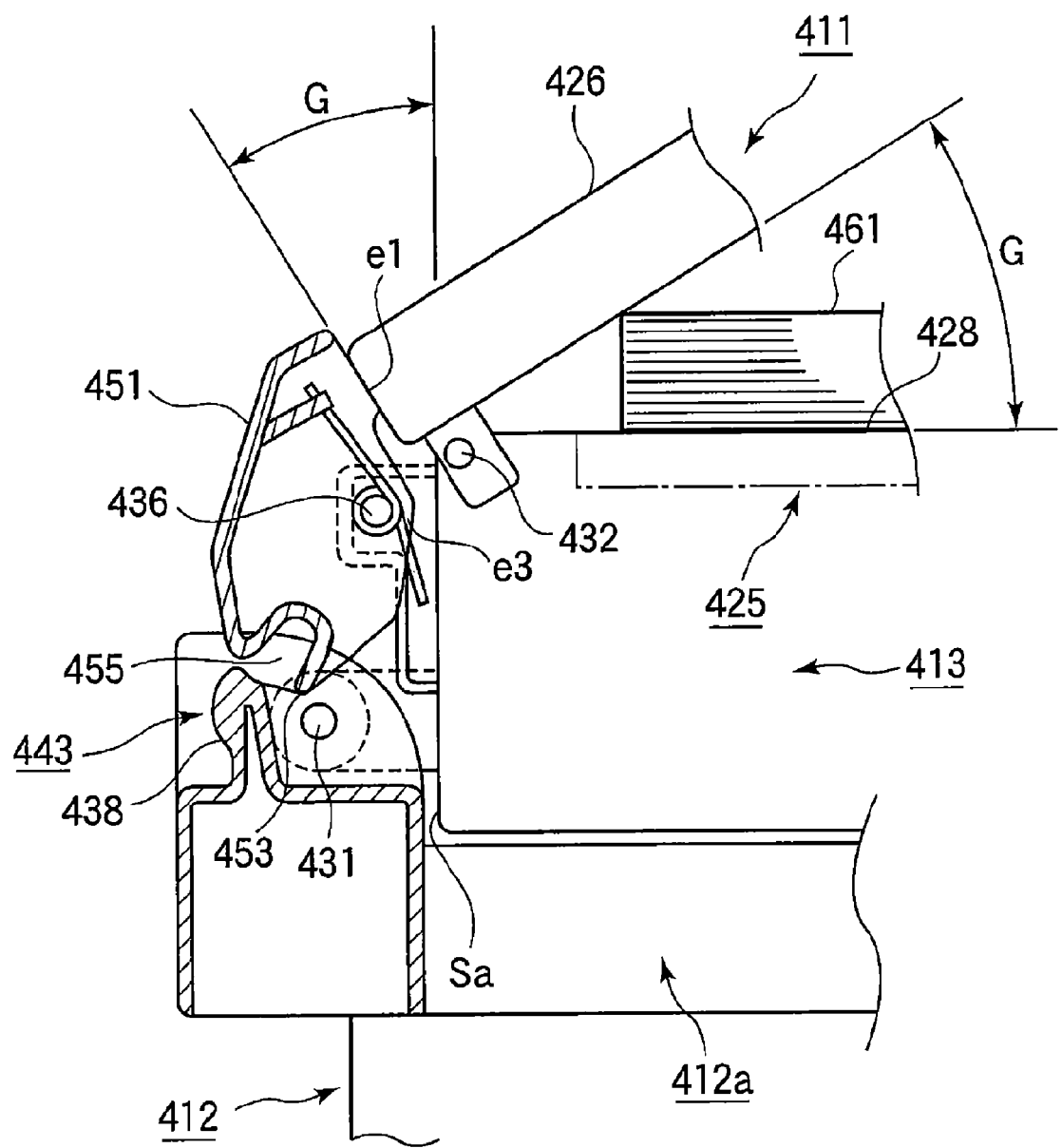
FIG. 44 is a first figure illustrating the operation of the multifunction apparatus of the fourth embodiment.
Figure 45:
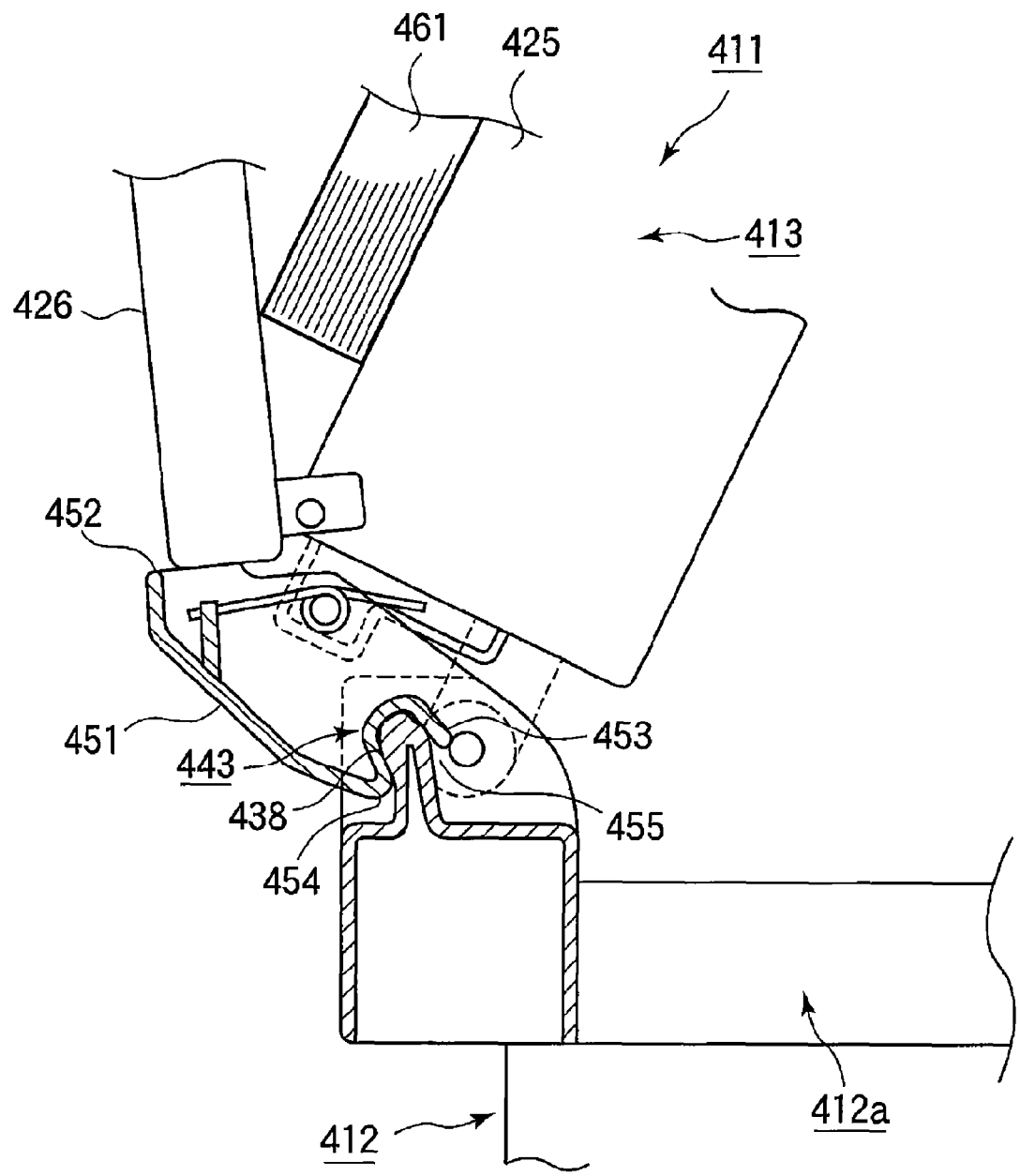
FIG. 45 is a second figure illustrating the operation of the multifunction apparatus of the fourth embodiment.

FIG. 44 is a first figure illustrating the operation of the multifunction apparatus of the fourth embodiment. FIG. 45 is a second figure illustrating the operation of the multifunction apparatus of the fourth embodiment.

FIG. 44 illustrates the document cover 426 at its closed position when a thick original 461 such as a book is placed on the flat bed 425 of the scanner 413. Because of the thickness of the original 461, the document cover 426 cannot be closed completely, being open by an angle G between the document cover 426 and an original reading surface 428. At this moment, the stopper 451 has rotated about the shaft 436 to form an angle G between the first side surface e1 of the stopper 451 and the rear surface Sa of the scanner 413.

As the stopper 451 rotates about the shaft 436, the guide portion 453 moves in the cylindrical plane R (FIG. 43), becoming closer to the scanner 413 than the support 443.

When the scanner 413 is rotated in the opening direction with the original 461 remaining on the flat bed 425 and the document cover 426 closed, the support 43 enters the recess 455 to be received in the recess 455 intimately. Thus, the stopper 451 cannot rotate any further, preventing the document cover 426 from further rotate to further open. This not only prevents the document cover 426 from being damaged but also prevents the original 461 from dropping from between the document cover 426 and the flat bed 425.

The fourth embodiment employs only one recess 455 but more than one recess may be employed, in which case, the rotation of the stopper 451 may be stopped at a plurality of parts of the stopper 451, thereby ensuring that the scanner 413 is stopped with reliability even if the document 461 is thicker.

Fifth Embodiment

Elements similar to those in the third embodiment have been given the same reference numerals and their description is omitted.

Figure 46:
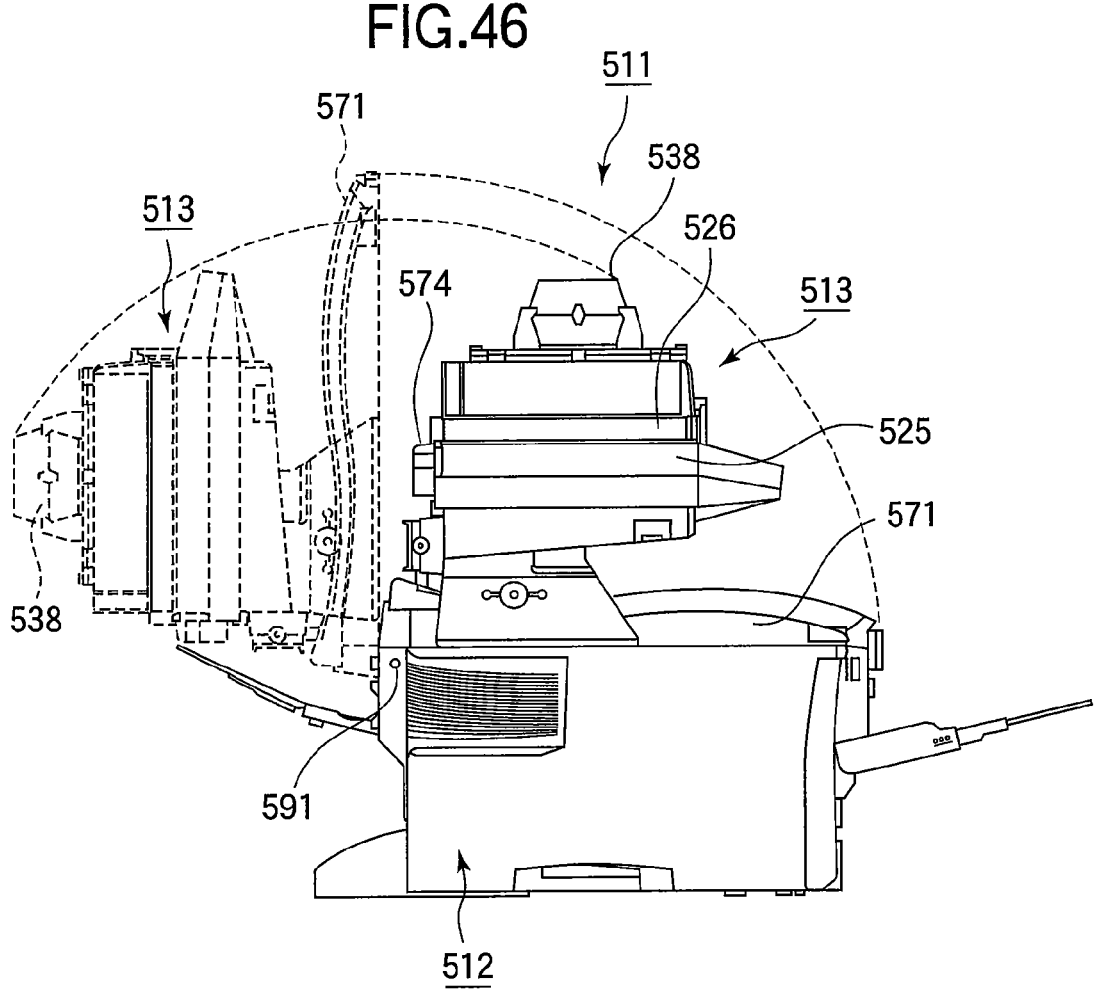
FIG. 46 is a front view of a multifunction apparatus of a fifth embodiment.

FIG. 46 is a front view of a multifunction apparatus of a fifth embodiment.

Referring to FIG. 46, a multifunction apparatus 511 includes a printer 512, a scanner 513, and a top cover 571. The printer operates as an image forming apparatus. The printer scanner 513 is mounted on the printer via the top cover 571 and reads an image of an original. The top cover 571 is pivotal about a shaft 591. When the top cover 571 is at its closing position (FIG. 47), the scanner 513 is at its closing position shown in solid lines. When the top cover 571 is at its opening position, the scanner 513 is at its opening position shown in dotted lines.

A stopper unit 574 is located substantially over the shaft 591 and near a shaft 532 about which a document cover 526 rotates.

Figure 47:
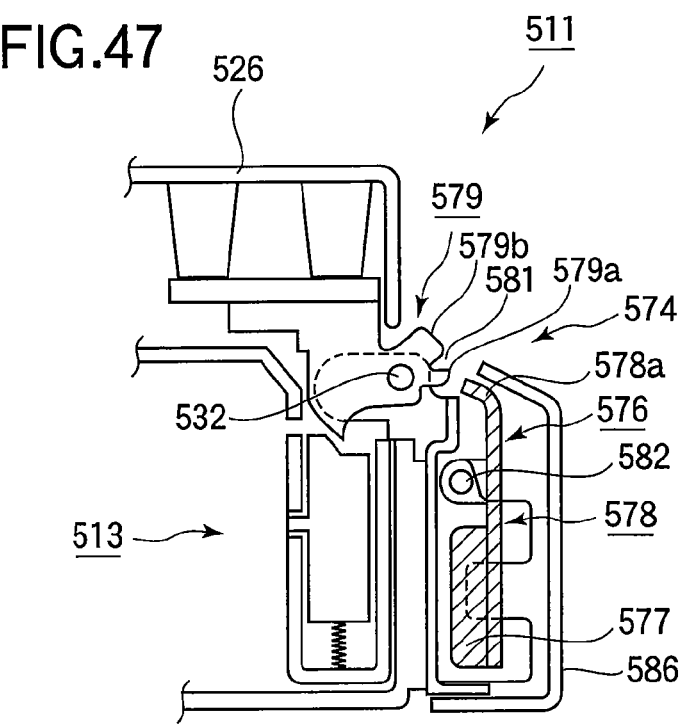
FIG. 47 is a first figure illustrating the operation of the multifunction apparatus.

FIG. 47 is a first figure illustrating the operation of the multifunction apparatus.

Referring to FIG. 47, the stopper unit 574 includes a weight unit 576 and an outer cover 586 that encloses the weight unit 576. The weight unit 576 includes a weight 577 and a support 578 that supports the weight 577 at one longitudinal end portion of the support 578. The support 578 is mounted at its one third of the length of the support 578 to a shaft 582 such that the support 578 is allowed to swing about the shaft 582. The support 578 includes an engagement portion 578a formed on a side of the support 578 remote from the weight 577.

A positioning lever 579 is mounted on the shaft 532 under the document cover 526, and includes a first finger 579a and a second finger 579b and a recess 81 between the first and second fingers 579a and 579b. The document cover 526 is pivotal about the shaft 532 relative to the scanner 513.

The weight unit 76 and positioning lever 579 form a mechanism for restricting the rotation of the scanner 513. The operation of the multifunction apparatus of the aforementioned configuration will be described.

Figure 48:
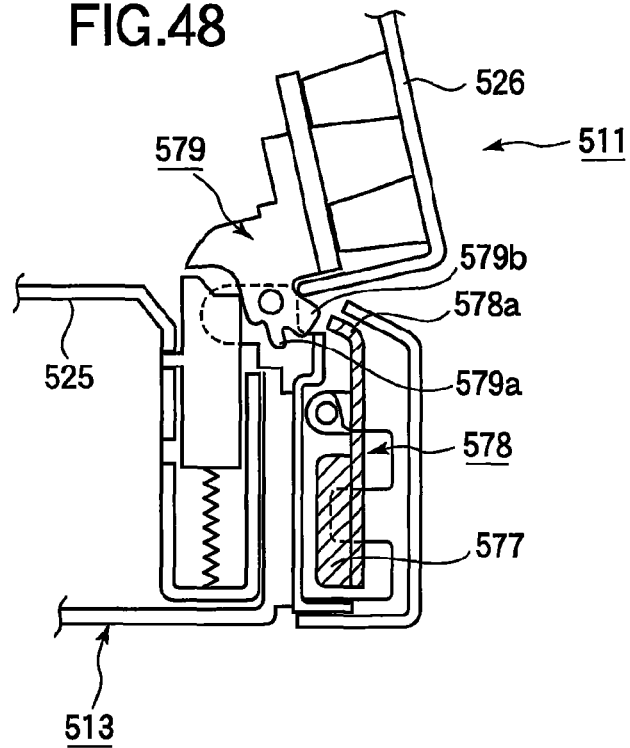
FIG. 48 is a second figure illustrating the operation of the multifunction apparatus.

FIG. 48 is a second figure illustrating the operation of the multifunction apparatus.

When the scanner 513 and the document cover 526 are at their closing positions (FIG. 47), the weight 576 is at its first position. When the document cover 526 is rotated from the closing position with the scanner 513 remaining closed (FIG. 48), the positioning lever 579 rotates together with the document cover 526 without contacting the engagement portion 578a. In this manner, when both scanner 513 and top cover 571 are at their closing position, the document cover 526 is allowed to rotate so that the document cover 526 is opened.

Figure 49:
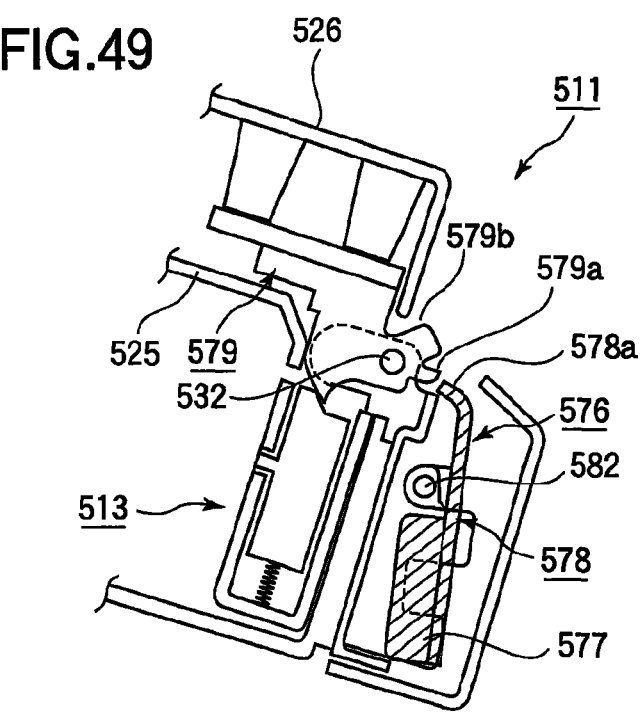
FIG. 49 is a third figure illustrating the operation of the multifunction apparatus.

FIG. 49 is a third figure illustrating the operation of the multifunction apparatus.

Referring to FIG. 49, when the top cover 571 is rotated with the document cover 526 remaining closed, the scanner 513 rotates into an inclined position. As the scanner 513 rotates, the weight unit 576 rotates about the shaft 582 relative to the scanner 513, the weight unit 576 being oriented in a plumb line such that the weight unit 576 is at its second position (FIG. 49) allowing the engagement portion 578a approaches the positioning lever 579.

Figure 50:
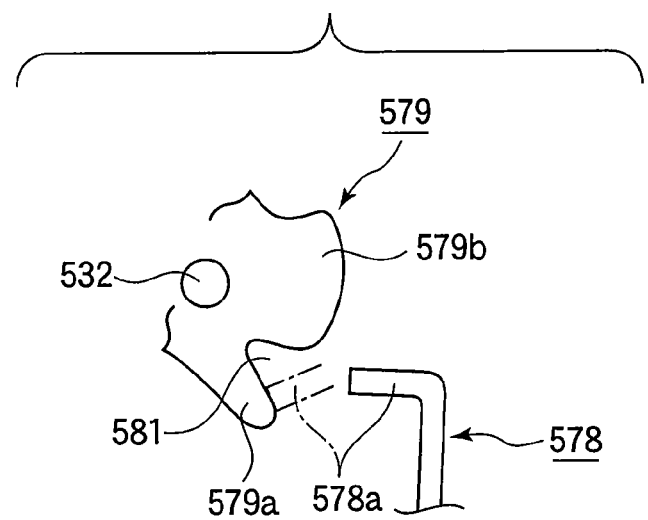
FIG. 50 is a first figure illustrating a positioning lever of the fifth embodiment.
Figure 51:
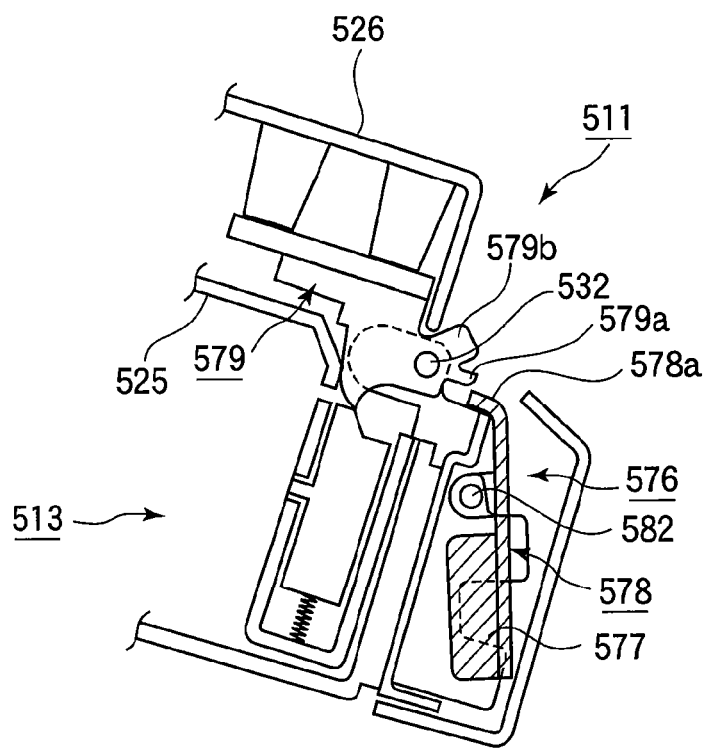
FIG. 51 is a fourth figure illustrating the operation of the multifunction apparatus.
Figure 52:
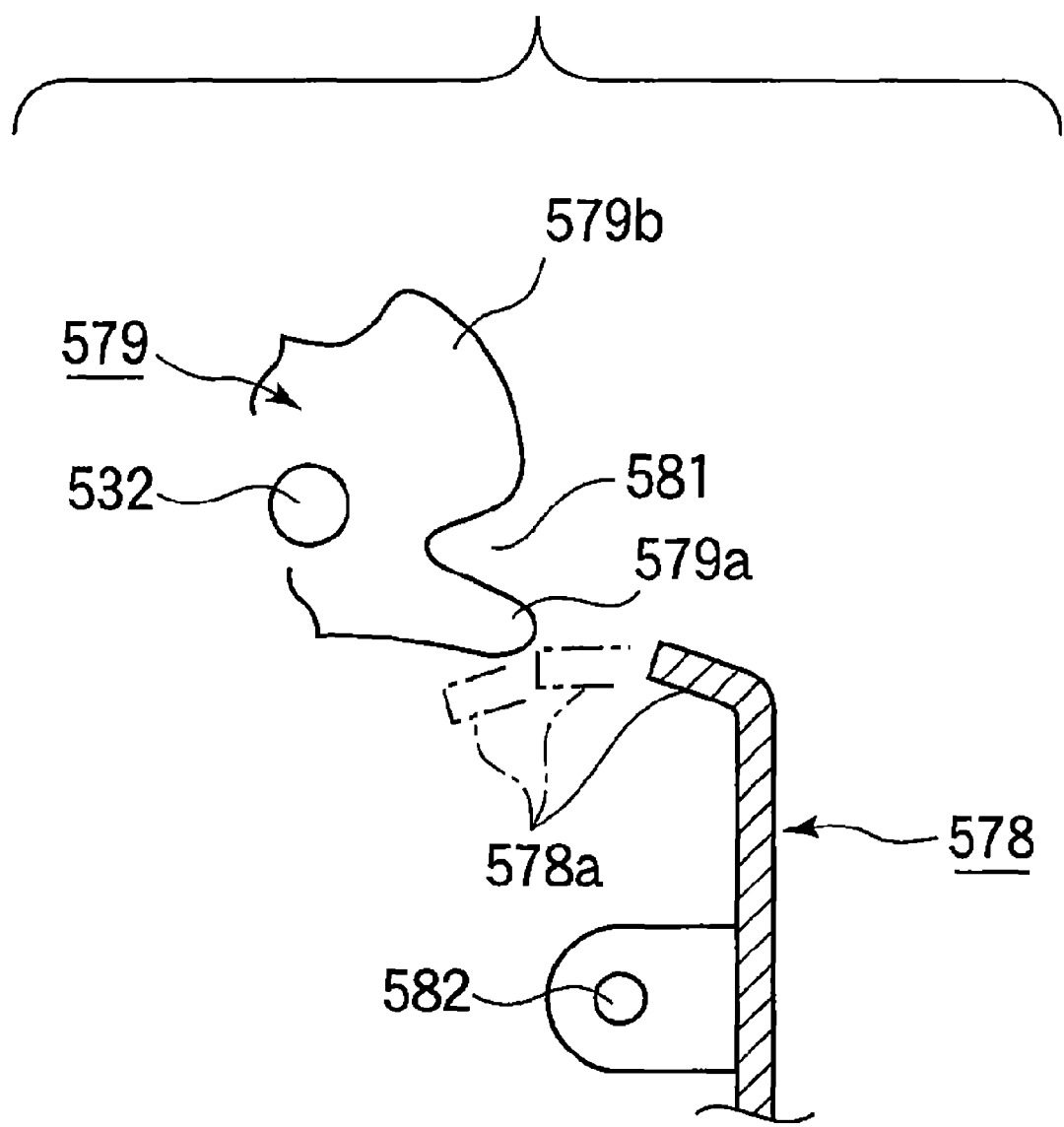
FIG. 52 is a second figure illustrating the positioning lever.

FIG. 50 is a first figure illustrating a positioning lever of the fifth embodiment. FIG. 51 is a fourth figure illustrating the operation of the multifunction apparatus. FIG. 52 is a second figure illustrating the positioning lever.

Further rotating the top cover 571 causes the scanner 513 to rotate into a tilted orientation as shown in FIGS. 51 and 52. At this moment, the weight unit 576 further rotates relative to the scanner 513. The engagement portion 578a further rotates about the shaft 582 to take up a position under the positioning lever 579.

For example, when the operator rotates the scanner 513 with a thick original such as a book remaining on a flat bed 525, the engagement portion 578a enters the recess 581 as shown in dotted lines in FIG. 50, thereby preventing the document cover 526 from rotating. As a result, the weight support 578 restricts the rotation of the document cover 526.

When the scanner 513 is opened by a large angle, the second finger 579b of the positioning lever 579 restricts the rotation of the document cover 526, so that the original remains closed. Thus, the configuration not only prevents the document cover 526 from being damaged but also prevents the original from dropping from between the document cover 526 and the flat bed 525.

While the third to fifth embodiments have been described in terms of the multifunction apparatus 11 having the scanner 513 stacked on the printer 512, the present invention may be applicable to a multifunction apparatus in which a copying machine or a facsimile machine is disposed on the printer, or a multifunction apparatus in which image forming sections are provided on the original reading section.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:
1. An image processing apparatus, comprising:
a lower unit including a first body and a first lid configured to open and close relative to the lower unit, the first body including a first engagement member;
an upper unit including a second body and a second lid configured to open and close relative to the upper unit, the upper unit being disposed over the lower unit, the second lid including a second engagement member; and
a limiting mechanism which holds the second lid closed when the first lid is opened and which holds the first lid closed when the second lid is opened, the limiting mechanism including a first limiting member and a second limiting member, the first and second limiting members being rotatable about a common rotational axis,
wherein the first limiting member includes a first engagement element that moves into and out of engagement with the first engagement member and a first operation portion that moves into and out of engagement with the second engagement member,
wherein the second limiting member includes a second engagement element that moves into and out of engagement with the second engagement member and a second operation portion that moves into and out of engagement with the first engagement member,
wherein when the first and second lids are closed, the first operation portion moves into engagement with the second engagement member, the second operation portion moves into engagement with the first engagement member, the first engagement element disen- gages from the first engagement member, and the second engagement element disengages from the second engagement member, wherein when the second lid is closed and the first lid is opened, the first operation portion engages the second engagement member, the second operation portion disengages from the first engagement member, the first engagement element disengages from the first engagement member, and the second engagement element engages the second engagement member, and wherein when the first lid is closed and the second lid is opened, the first operation portion disengages from the second engagement member, the second operation portion engages the first engagement member, the first engagement element engages the first engagement member, and the second engagement element disengages from the second engagement member.

2. The image processing apparatus according to claim 1, wherein the first engagement member includes an abutment that is engageable with the second operation portion, and wherein the second engagement member includes an abutment that is engageable with the first operation portion.

3. An multifunction apparatus incorporating the image processing apparatus according to claim 1, wherein the lower unit is an image forming apparatus configured to form an image on a medium and wherein the upper unit is an image reading apparatus configured to read an image from the medium.

4. The image processing apparatus according to claim 1, wherein the first and second limiting members are configured to rotate relative to the second body.

5. The image processing apparatus according to claim 4, wherein the first engagement member includes a first engagement piece that is engageable with the first engagement element, and wherein the second engagement member includes a second engagement piece that is engageable with the second engagement element.

6. The image processing apparatus according to claim 4, wherein the first engagement member includes an abutment that is engageable with the second operation portion, and wherein the second engagement member includes an abutment that is engageable with the first operation portion.

7. The image processing apparatus according to claim 1, wherein the first engagement member includes a first engagement piece that is engageable with the first engagement element, and wherein the second engagement member includes a second engagement piece that is engageable with the second engagement element.

8. The image processing apparatus according to claim 7, wherein the first engagement member includes an abutment that is engageable with the second operation portion, and wherein the second engagement member includes an abutment that is engageable with the first operation portion.

* * * * *